(12) United States Patent
Moloney et al.

(10) Patent No.: US 11,625,910 B2
(45) Date of Patent: Apr. 11, 2023

(54) METHODS AND APPARATUS TO OPERATE A MOBILE CAMERA FOR LOW-POWER USAGE

(71) Applicant: Movidius Limited, Schiphol-Rijk (NL)

(72) Inventors: David Moloney, Dublin (IE); Alireza Dehghani, Dublin (IE)

(73) Assignee: MOVIDIUS LIMITED, Schiphol-Rijk (NL)

( * ) Notice: Subject to any disclaimer, the term of this patent is extended or adjusted under 35 U.S.C. 154(b) by 0 days.

(21) Appl. No.: 17/549,408

(22) Filed: Dec. 13, 2021

(65) Prior Publication Data

US 2022/0174215 A1 Jun. 2, 2022

Related U.S. Application Data

(63) Continuation of application No. 16/746,439, filed on Jan. 17, 2020, now Pat. No. 11,240,430, which is a
(Continued)

(51) Int. Cl.
*H04N 7/18* (2006.01)
*G06V 10/82* (2022.01)
(Continued)

(52) U.S. Cl.
CPC ............ *G06V 10/82* (2022.01); *G06F 16/164* (2019.01); *G06N 3/02* (2013.01); *G06V 40/166* (2022.01);
(Continued)

(58) Field of Classification Search
CPC .. H04N 7/18; H04N 5/23241; H04N 5/23219; G06F 16/164; G06K 9/00255;
(Continued)

(56) References Cited

U.S. PATENT DOCUMENTS 8,345,921 B1 1/2013 Frome et al.
8,508,520 B2 8/2013 Porwal
(Continued)

FOREIGN PATENT DOCUMENTS

CN 103002214 3/2013
CN 106211803 12/2016
(Continued)

OTHER PUBLICATIONS

International Searching Authority, "International Search Report," dated Mar. 7, 2019 in connection with International Application No. PCT/EP2019/050462 (7 pages).
(Continued)

*Primary Examiner* — Trang U Tran
(74) *Attorney, Agent, or Firm* — Hanley, Flight and Zimmerman, LLC

(57) ABSTRACT

A disclosed example to operate a mobile camera includes recognizing a first feature in first sensor data in response to the first feature being detected in the first sensor data; transitioning the mobile camera from a first feature detection state to a second feature detection state in response to the recognizing of the first feature, the mobile camera to operate using higher power consumption in second feature detection state than in the first feature detection state; recognizing a second feature in second sensor data in the second feature detection state; and sending to an external device at least one of first metadata corresponding to the first feature or second metadata corresponding to the second feature.

25 Claims, 10 Drawing Sheets

Related U.S. Application Data continuation of application No. 15/870,007, filed on Jan. 12, 2018, now Pat. No. 10,574,890.

(51) Int. Cl.
| | |
|---|---|
| *G06V 40/20* | (2022.01) |
| *G06V 40/16* | (2022.01) |
| *H04N 23/65* | (2023.01) |
| *H04N 23/45* | (2023.01) |
| *H04N 23/61* | (2023.01) |
| *H04N 23/611* | (2023.01) |
| *H04N 23/667* | (2023.01) |
| *G06F 16/16* | (2019.01) |
| *G06N 3/02* | (2006.01) |
| *G10L 19/00* | (2013.01) |
| *G10L 25/51* | (2013.01) |
| *G10L 25/78* | (2013.01) |
| *G10L 15/16* | (2006.01) |
| *G06V 10/22* | (2022.01) |

(52) U.S. Cl.
CPC ............ *G06V 40/172* (2022.01); *G06V 40/20* (2022.01); *G10L 19/00* (2013.01); *G10L 25/51* (2013.01); *G10L 25/78* (2013.01); *H04N 23/45* (2023.01); *H04N 23/61* (2023.01); *H04N 23/611* (2023.01); *H04N 23/65* (2023.01); *H04N 23/651* (2023.01); *H04N 23/667* (2023.01); *G06V 10/235* (2022.01); *G06V 40/16* (2022.01); *G10L 15/16* (2013.01)

(58) Field of Classification Search
CPC ........... G06K 9/00288; G06K 9/00335; G06K 9/209; G06K 9/6202; G06K 9/66; G06N 3/02; G10L 19/00; G10L 25/51; G10L 25/78
USPC .......................... 348/77, 220.1, 231.1–231.3
See application file for complete search history.

(56) References Cited

U.S. PATENT DOCUMENTS

| | | | |
|---|---|---|---|
| 9,471,840 B2* | 10/2016 | Govil et al. ............ G10L 25/18 |
| 9,538,145 B2* | 1/2017 | Iwasaki .................. G06V 10/24 |
| 9,802,599 B2 | 10/2017 | Abou-Nasr et al. |
| 9,805,739 B2* | 10/2017 | Nongpiur ................ G10L 25/18 |
| 9,836,484 B1* | 12/2017 | Bialynicka-Birula ...................... H04N 5/23219 |
| 9,838,641 B1* | 12/2017 | Lim ..................... H04N 9/8042 |
| 9,934,781 B2 | 4/2018 | Subhojit et al. |
| 10,205,913 B2* | 2/2019 | Smith .................. G08B 29/185 |
| 10,225,511 B1 | 3/2019 | Lim et al. |
| 10,354,133 B2 | 7/2019 | Chen et al. |
| 10,574,890 B2 | 2/2020 | Moloney et al. |
| 10,915,995 B2 | 2/2021 | Moloney |
| 11,240,430 B2 | 2/2022 | Moloney et al. |
| 11,423,517 B2 | 8/2022 | Moloney |
| 2003/0214592 A1 | 11/2003 | Ikeyama |
| 2008/0049020 A1 | 2/2008 | Gusler et al. |
| 2008/0084473 A1 | 4/2008 | Romanowich |
| 2009/0101709 A1 | 4/2009 | Nonaka |
| 2009/0262987 A1 | 10/2009 | Ioffe et al. |
| 2010/0082244 A1 | 4/2010 | Yamaguchi et al. |
| 2011/0245942 A1 | 10/2011 | Yamamoto et al. |
| 2011/0256886 A1 | 10/2011 | Velusamy |
| 2012/0177288 A1 | 7/2012 | Chaussat et al. |
| 2012/0280783 A1 | 11/2012 | Gerhardt et al. |
| 2013/0300760 A1 | 11/2013 | Sugano et al. |
| 2014/0078172 A1 | 3/2014 | Systrom et al. |
| 2014/0118545 A1 | 5/2014 | Iwasaki |
| 2014/0118553 A1 | 5/2014 | Diba |
| 2014/0185953 A1 | 7/2014 | Hsieh et al. |
| 2014/0222985 A1 | 8/2014 | Chen et al. |
| 2014/0241585 A1 | 8/2014 | Zafiroglu et al. |
| 2014/0258526 A1 | 9/2014 | Le Sant et al. |
| 2014/0316633 A1 | 10/2014 | Tsujimoto et al. |
| 2014/0334684 A1 | 11/2014 | Strimling |
| 2014/0368626 A1 | 12/2014 | John Archibald et al. |
| 2015/0009527 A1 | 1/2015 | Mochizuki |
| 2015/0138225 A1 | 5/2015 | Minato et al. |
| 2015/0172539 A1 | 6/2015 | Neglur |
| 2015/0186743 A1 | 7/2015 | Karnos |
| 2015/0189176 A1* | 7/2015 | Pacurariu ............ H04N 5/23258 348/143 |
| 2015/0242405 A1 | 8/2015 | Hostyn et al. |
| 2015/0324686 A1 | 11/2015 | Julian et al. |
| 2015/0339519 A1* | 11/2015 | Ueta .................... G06V 40/103 382/103 |
| 2015/0378658 A1 | 12/2015 | Mandigo et al. |
| 2016/0007008 A1* | 1/2016 | Molgaard ........... H04N 5/23216 348/47 |
| 2016/0034809 A1 | 2/2016 | Trenholm et al. |
| 2016/0037110 A1 | 2/2016 | Choi et al. |
| 2016/0042668 A1 | 2/2016 | Sorensen |
| 2016/0173752 A1* | 6/2016 | Caviedes ........... H04N 1/00204 348/207.11 |
| 2017/0161579 A1 | 6/2017 | Gousev et al. |
| 2017/0180632 A1 | 6/2017 | Yang |
| 2017/0272660 A1 | 9/2017 | Ishihara et al. |
| 2017/0302903 A1* | 10/2017 | Ng ....................... H04N 13/128 |
| 2017/0329903 A1 | 11/2017 | Shu et al. |
| 2017/0339178 A1 | 11/2017 | Mahaffey et al. |
| 2017/0345615 A1 | 11/2017 | Zotta et al. |
| 2017/0351940 A1 | 12/2017 | Mazzarella et al. |
| 2017/0353699 A1 | 12/2017 | Wang |
| 2018/0032917 A1 | 2/2018 | Hagen et al. |
| 2018/0196587 A1 | 7/2018 | Bialynicka-Birula et al. |
| 2018/0232580 A1 | 8/2018 | Wolf |
| 2018/0373988 A1 | 12/2018 | Dhanyamraju |
| 2018/0374105 A1 | 12/2018 | Azout et al. |
| 2019/0042937 A1 | 2/2019 | Sheller et al. |
| 2019/0064575 A1 | 2/2019 | Yang et al. |
| 2019/0089910 A1 | 3/2019 | Banik et al. |
| 2019/0114693 A1 | 4/2019 | Zhang et al. |
| 2019/0222756 A1 | 7/2019 | Moloney et al. |
| 2019/0279082 A1 | 9/2019 | Moloney et al. |
| 2019/0310611 A1 | 10/2019 | Jain et al. |
| 2020/0059587 A1 | 2/2020 | Pribble et al. |
| 2020/0098096 A1 | 3/2020 | Moloney |
| 2020/0396383 A1 | 12/2020 | Moloney et al. |
| 2021/0118103 A1 | 4/2021 | Moloney |

FOREIGN PATENT DOCUMENTS

| | | |
|---|---|---|
| CN | 107145833 | 9/2017 |
| CN | 107480611 | 12/2017 |
| CN | 107169402 | 9/2018 |
| WO | 2017031716 | 3/2017 |
| WO | 2018033890 | 2/2018 |
| WO | 2019137967 | 7/2019 |
| WO | 2019170785 | 9/2019 |
| WO | 2020064326 | 4/2020 |

OTHER PUBLICATIONS

International Searching Authority, "Written Opinion," dated Mar. 7, 2019 in connection with International Application No. PCT/EP2019/050462 (10 pages).

Li et al., "Automatic Musical Pattern Feature Extraction Using Convolutional Neural Network," Proceedings of the International MultiConference of Engineers and Computer Scientists, 2010 vol. I, IMECS 2010, Mar. 17-19, 2010, Hong Kong (5 pages).

Ogmen et al., "Neural Network Architectures for Motion Perception and Elementary Motion Detection in the Fly Visual System," Neural Networks, vol. 3, pp. 487-505, 1990 (19 pages).

Maturana et al., "VoxNet: A 3D Convolutional Neural Network for Real-Time Object Recognition," 2015 IEEE/RSJ International Conference on Intelligent Robots and Systems (IROS), Congress Center Hamburg, Sep. 28-Oct. 2, Hamburg, Germany (7 pages).

(56) References Cited

OTHER PUBLICATIONS

Phong, "Privacy-Preserving Stochastic Gradient Descent with Multiple Distributed Trainers," International Conference on Computer Analysis of Images and Patterns (CAIP), 2017, pp. 510-518 (9 pages).

McMahan et al, "Communication-Efficient Learning of Deep Networks from Decentralized Data," Feb. 28, 2017, pp. 1-11, retrieved from the Internet on Jan. 7, 2019 [https://arxiv.org/pdf/1602.05629.pdf] (11 pages).

Chen et al., "Adaptive Silouette Extraction and Human Tracking in Complex and Dynamic Environments," IEEE International Conference on Image Processing, Atlanta, GA, Oct. 8-11, 2006 (4 pages).

Dehghani et al., "EoT Device with Factor Form Board," Nov. 15, 2016, retrieved from the Internet [http://eyesofthings.eu/wp-content/uploads/deliverables/EoT_D2.6.pdf] (57 pages).

United States Patent and Trademark Office, "Non-Final Rejection," dated Mar. 21, 2019 in connection with U.S. Appl. No. 15/870,007 (12 pages).

United States Patent and Trademark Office, "Notice of Allowance," dated Sep. 6, 2019 in connection with U.S. Appl. No. 15/870,007 (5 pages).

United States Patent and Trademark Office, "Corrected Notice of Allowability," dated Jan. 28, 2020 in connection with U.S. Appl. No. 15/870,007 (2 pages).

China National Intellectual Property Adminstration, "First Office Action," dated Jun. 30, 2021 in connection with Chinese Patent Application No. 201970008306.2, 26 pages (including English language translation).

European Patent Office, "Intention to Grant," dated Oct. 15, 2021 in connection with European Patent Application No. 19700870.9, 7 pages.

China National Intellectual Property Administration, "Notification of 2nd Office Action," dated Jan. 6, 2022 in connection with Chinese Patent Application No. 201980008306.2, 14 page, including translation.

Intellectual Property India, "Office Action," dated Feb. 24, 2022 in connection with Indian Patent Application No. 202047028972, 7 pages.

United States Patent and Trademark Office, "Non-Final Rejection," dated Dec. 24, 2020 in connection with U.S. Appl. No. 16/746,439 (9 pages).

United States Patent and Trademark Office, "Notice of Allowance," dated Apr. 14, 2021 in connection with U.S. Appl. No. 16/746,439 (7 pages).

United States Patent and Trademark Office, "Corrected Notice of Allowability," dated Jun. 4, 2021 in connection with U.S. Appl. No. 16/746,439 (2 pages).

United States Patent and Trademark Office, "Corrected Notice of Allowability," dated Aug. 4, 2021 in connection with U.S. Appl. No. 16/746,439 (2 pages).

United States Patent and Trademark Office, "Notice of Allowance," dated Aug. 20, 2021 in connection with U.S. Appl. No. 16/746,439 (7 pages).

United States Patent and Trademark Office, "Corrected Notice of Allowability," dated Dec. 30, 2021 in connection with U.S. Appl. No. 16/746,439 (2 pages).

Felenasoft, "Face Blur in Xeoma Video Surveillance," Nov. 17, 2016, retrieved from [https://felenasoft.com/xeoma/en/articles/face-blur/] on Dec. 31, 2021, 4 pages.

European Patent Office, "Intention to Grant," dated Apr. 7, 2022 in connection with European Patent Application No. 19700870.9, 8 pages.

China National Intellectual Property Administration, "Notice of Completing Formalities for Patent Registration," issued Jun. 21, 2022 in connection with Chinese Patent Application No. 201980008306.2, 4 pages (including translation).

\* cited by examiner

METHODS AND APPARATUS TO OPERATE A MOBILE CAMERA FOR LOW-POWER USAGE

RELATED APPLICATIONS

This patent arises from a continuation of U.S. patent application Ser. No. 16/746,439, filed on Jan. 17, 2020, which is a continuation of U.S. patent application Ser. No. 15/870,007, filed on Jan. 12, 2018, now U.S. Pat. No. 10,574,890, both of which are hereby incorporated herein by reference in their entireties.

FIELD OF THE DISCLOSURE

This disclosure is generally related to mobile computing, and more specifically to methods and apparatus to operate a mobile camera for low-power usage.

BACKGROUND

Digital cameras are often integrated into handheld mobile computing devices such as cellular telephones and handheld media devices. Digital cameras are also often integrated into other types of computing devices such as tablet computing devices and laptop computers. Such digital cameras are operated by users to capture digital images and videos. Digital images and videos can be stored locally at a memory of the computing device in which the digital camera is integrated, or they can be sent to a network-accessible storage location across a public network such as the Internet or across a private network. In any case, the digital images and videos may be subsequently accessed by the originators of those images and videos or by other persons having access privileges.

BRIEF DESCRIPTION OF THE DRAWINGS

The figures are not to scale. Instead, for purposes of clarity, different illustrated aspects may be enlarged in the drawings. In general, the same reference numbers will be used throughout the drawings and accompanying written description to refer to the same or like parts.

DETAILED DESCRIPTION

Figure 1A:
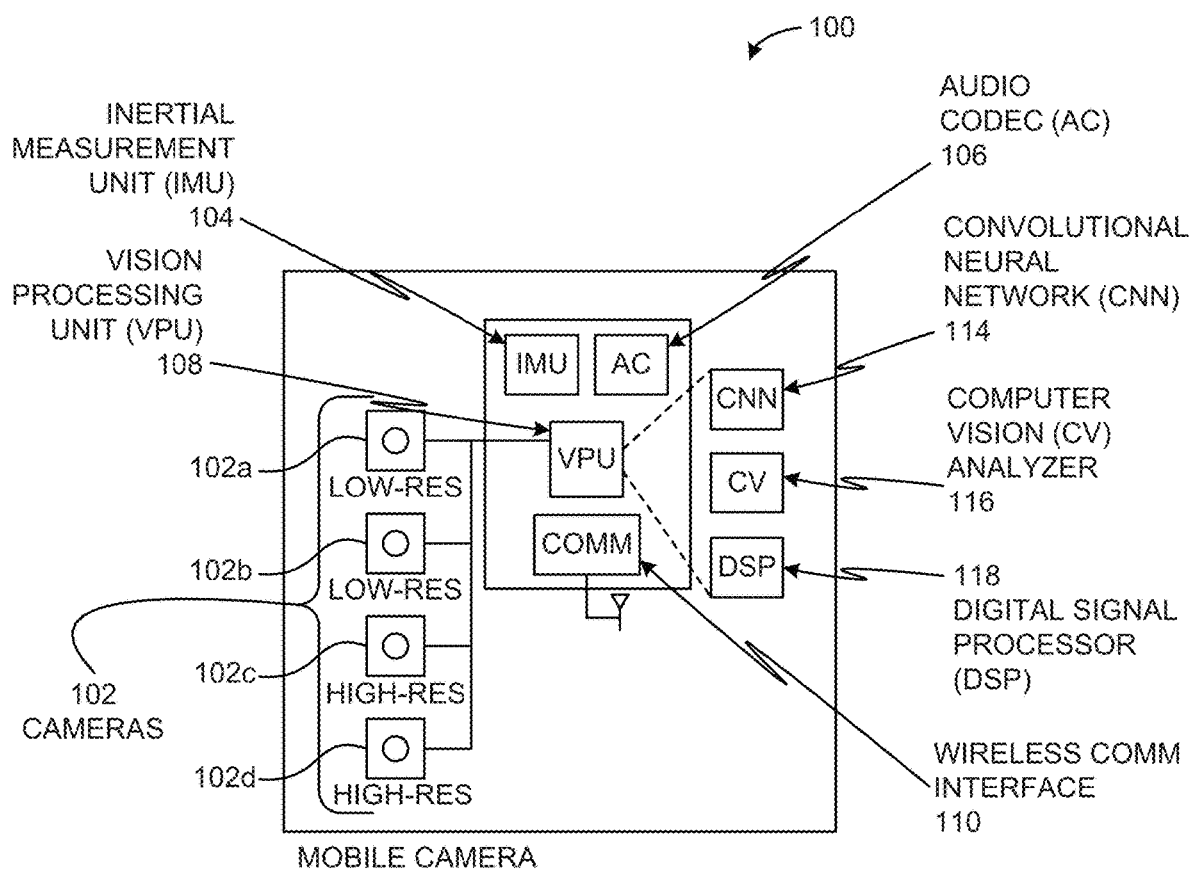
FIG. 1A illustrates an example mobile camera implemented in accordance with teachings of this disclosure.

Example methods and apparatus disclosed herein operate mobile cameras with low-power usage. Examples disclosed herein may operate mobile cameras which have limited power sources while enabling numerous uses for the mobile cameras for productivity, entertainment, and/or as technologies that assist users in their day-to-day activities (e.g., assistive technologies). Example mobile cameras disclosed herein operate in a low-power feature monitoring mode and one or more higher-power active modes. The low-power feature monitoring mode enables a mobile camera to monitor characteristics of its surrounding environment while consuming little power (e.g., ~2 milliwatts or less). In the low-power feature monitoring mode, environment analysis logic of an example mobile camera monitors environmental characteristics to identify features of interest representing stimuli that warrant transitioning the mobile camera to a higher-power active mode in which the mobile camera can monitor additional types of environmental characteristics and/or capture one or more high-quality visual captures. As used herein, "visual captures" are images and/or video captured by one or more cameras. In examples disclosed herein involving the processing of a visual capture, the visual capture may be a single image capture or may be a frame that is part of a sequence of frames of a video capture.

Example environmental characteristics monitored by mobile cameras disclosed herein include visual characteristics, audio characteristics, and/or motion characteristics. To monitor such environmental characteristics, example mobile cameras disclosed herein are provided with multiple sensors. Example sensors include cameras, microphones, and/or motion detectors. Other types of sensors may also be provided without departing from the scope of this disclosure. By using a low-power feature monitoring mode to monitor environmental characteristics, examples disclosed herein enable mobile cameras to operate for long durations (e.g., days or weeks) at relatively low rates of battery drain.

Examples disclosed herein also enable such power-conservative mobile cameras to intelligently detect when to transition into one or more higher-power active modes based on one or more detected environmental stimuli. That is, examples disclosed herein identify some environmental stimuli as trigger features that, when detected, indicate that a mobile camera is to be transitioned to a higher-power active mode to enable additional functionality of the mobile camera. For example, in a lowest-power feature monitoring mode, a mobile camera may power its motion detection subsystem and/or its audio monitoring subsystem while maintaining other sensor subsystems in a low-power standby mode. Upon detecting a motion trigger feature (e.g., a threshold amount of movement) and/or an audio trigger feature (e.g., a keyword, a particular sound, an animal sound, a vehicle sound, a human sound, a household sound, an industrial sound, etc.), the mobile camera may transition into a next higher-power mode in which a low-resolution camera is powered to capture low-resolution visual captures. The mobile camera may then analyze the low-resolution visual captures using machine vision processes to monitor for visual trigger features (e.g., faces, objects, vehicles, etc.). Upon detecting a visual trigger feature, the mobile camera may transition into a next higher-power mode in which one or more additional subsystems of the mobile camera are enabled. In some examples, the highest high-power active mode of the mobile camera may involve enabling one or more high-resolution cameras to capture high-quality visual captures. In such manners, examples disclosed herein enable mobile cameras to operate in power-constrained configurations for long durations while the mobile cameras intelligently operate intermittently in higher-power modes to capture high-quality data such as high-resolution visual captures of their surrounding environments.

Figure 1B:
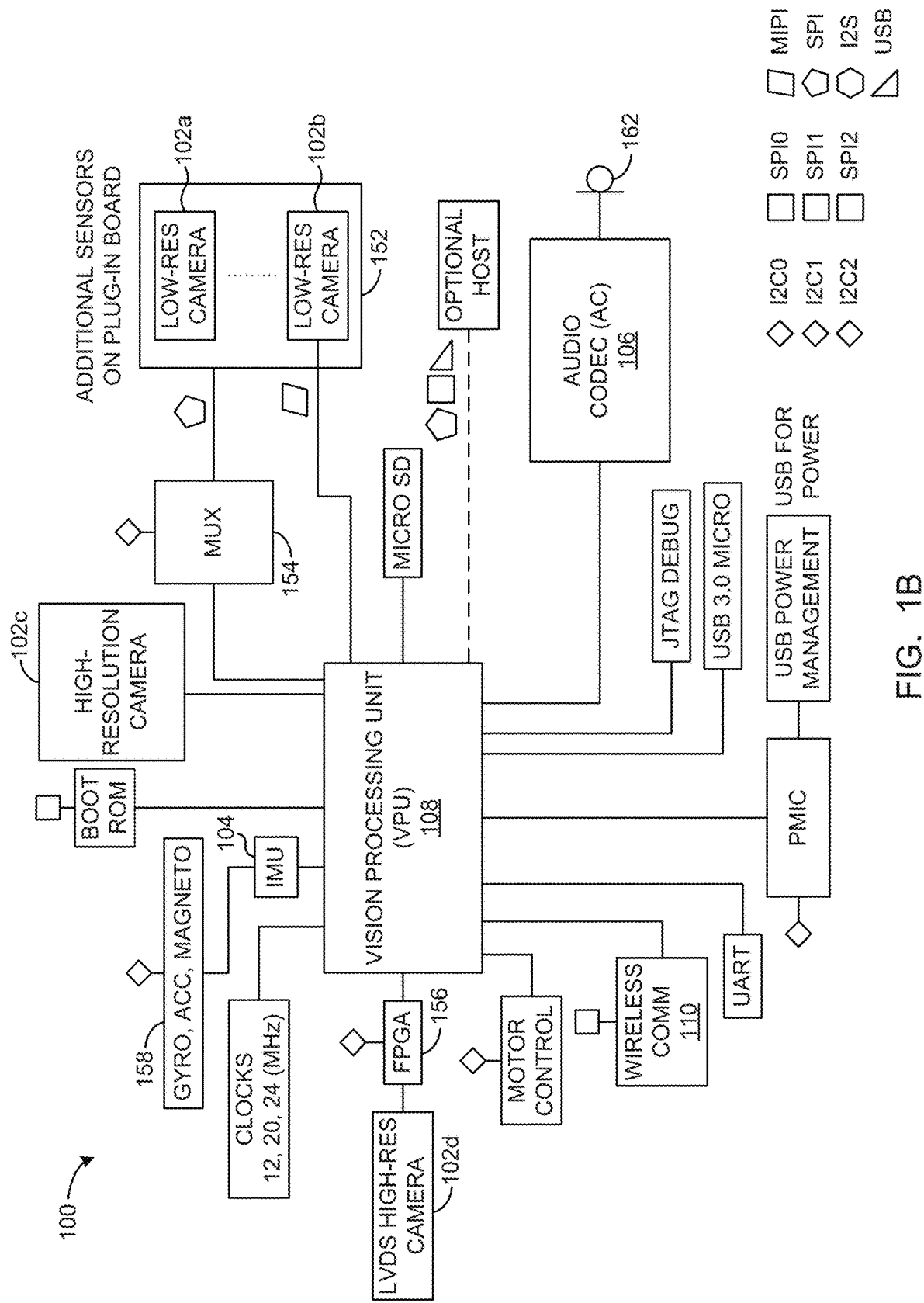
FIG. 1B illustrates an example hardware platform that may be used to implement the mobile camera shown in FIG. 1A.

FIG. 1A illustrates an example mobile camera 100 that includes a plurality of example cameras 102, an example inertial measurement unit (IMU) 104, an example audio codec (AC) 106, an example vision processing unit (VPU) 108, and an example wireless communication interface 110. FIG. 1B is an example hardware platform that may be used to implement the mobile camera 100 of FIG. 1A. The example mobile camera 100 may be a wearable camera and/or a mountable camera. A wearable camera may be worn or carried by a person. For example, the person may pin or attach the wearable camera to a shirt or lapel, wear the wearable camera as part of eyeglasses, hang the wearable camera from a lanyard around their neck, clip the wearable camera to their belt via a belt clip, clip or attach the wearable camera to a bag (e.g., a purse, a backpack, a briefcase, etc.), and/or wear or carry the wearable camera using any other suitable technique. In some examples, a wearable camera may be clipped or attached to an animal (e.g., a pet, a zoo animal, an animal in the wild, etc.). A mountable camera may be mounted to robots, drones, or stationary objects in any suitable manner to monitor its surroundings.

Example mobile cameras disclosed herein implement eyes on things (EOT) devices that interoperate with an EOT platform with which computers (e.g., servers, client devices, appliances, etc.) across the Internet can communicate via application programming interfaces (APIs) to access visual captures of environments, persons, objects, vehicles, etc. For example, a cloud service (e.g., provided by the cloud system 206) may implement such EOT platform to collect and/or provide access to the visual captures. In some examples, such visual captures may be the result of machine vision processing by the EOT devices and/or the EOT platform to extract, identify, modify, etc. features in the visual captures to make such visual captures more useful for generating information of interest regarding the subjects of the visual captures.

The example cameras 102 are provided to capture visual captures (e.g., images and/or video) and may be implemented using, for example, one or more CMOS (complementary metal oxide semiconductor) image sensor(s) and/or one or more CCD (charge-coupled device) image sensor(s). In the illustrated example of FIGS. 1A and 1B, the plurality of cameras 102 includes two low-resolution cameras 102a,b and two high-resolution cameras 102c,d. However, in other examples, some or all of the cameras 102 may be low resolution, and/or some or all may be high resolution.

Turning briefly to the example of FIG. 1B, the low-resolution cameras 102a,b are in circuit with the VPU 108 via a plug-in board 152 which serves as an expansion board through which additional sensors may be connected to the VPU 108. An example multiplexer 154 is in circuit between the VPU 108 and the plug-in board 152 to enable the VPU 108 to select which sensor to power and/or to communicate with on the plug-in board 152. Also in the illustrated example of FIG. 1B, the high-resolution camera 102c is in circuit directly with the VPU 108. The low-resolution cameras 102a,b and the high-resolution camera 102c may be connected to the VPU via any suitable interface such as a Mobile Industry Processor Interface (MIPI) camera interface (e.g., MIPI CSI-2 or MIPI CSI-3 interface standards) defined by the MIPI® Alliance Camera Working Group, a serial peripheral interface (SPI), an I2C serial interface, a universal serial bus (USB) interface, a universal asynchronous receive/transmit (UART) interface, etc. The high-resolution camera 102d of the illustrated example is shown as a low-voltage differential signaling (LVDS) camera that is in circuit with the VPU 108 via a field programmable gate array (FPGA) 156 that operates as an LVDS interface to convert the LVDS signals to signals that can be handled by the VPU 108. In other examples, the VPU 108 may be provided with a LVDS interface and the FPGA 156 may be omitted. In other examples, any combination of the low-resolution cameras 102a,b and the high-resolution cameras 102c,d may be in circuit with the VPU 108 directly, indirectly, and/or via the plug-in board 152. In any case, the mobile camera 100 can completely power off any or all the cameras 102a-d and corresponding interfaces so that the cameras 102a-d and the corresponding interfaces do not consume power.

In the illustrated examples of FIGS. 1A and 1B, the low-resolution cameras 102a,b consume substantially lower power than the high-resolution cameras 102c,d. As such, in some examples, the low-resolution cameras 102a,b can be implemented as low-power always on (AoN) cameras. To conserve battery power, the mobile camera 100 operates in a low-power feature monitoring mode in which the high-resolution camera(s) 102c,d is/are placed or set in a low-power standby mode (e.g., a mode in which the high-resolution camera(s) 102c,d consume very little power or no power) until the VPU 108 detects a visual feature of interest in one or more visual captures from the low-resolution camera(s) 102a,b. When such a visual feature of interest is detected, the mobile camera 100 transitions to a higher-power active mode in which the high-resolution camera(s) 102c,d is/are placed or set in an active mode to be powered up to capture a higher quality visual capture (e.g., of the visual feature of interest) than is possible of being captured using the low-resolution cameras 102a,b. In this manner, the power consumption attributable to visual monitoring by the mobile camera 100 can be maintained relatively low using examples disclosed herein by using the low-resolution cameras 102a,b during the low-power feature monitoring mode until a feature of interest is detected. Relatively more power drawn by the high-resolution cameras 102c,d need only be provided by the mobile camera 100 when the feature of interest is detected.

In some examples, the multiple cameras 102a-d of the illustrated example may be mechanically arranged to produce visual captures of different overlapping or non-overlapping fields of view. Visual captures of the different fields of view can be aggregated to form a panoramic view of an environment or form an otherwise more expansive view of the environment than covered by any single one of the visual captures from a single camera. In some examples, the multiple cameras 102a-d may be used to produce stereoscopic views based on combining visual captures captured concurrently via two cameras. In some examples, as in FIGS. 1A and 1B, a separate high-resolution camera may be provided for each low-resolution camera. In other examples, a single low-resolution camera is provided for use during a low-power feature monitoring mode, and multiple high-resolution cameras are provided to generate high-quality multi-view visual captures and/or high-quality stereoscopic visual captures when feature of interest confirmations are made using the low-resolution camera. In some examples in which the mobile camera 100 is mounted on non-human carriers such as unmanned aerial vehicles (UAVs), robots or drones, the mobile camera 100 may be provided with multiple cameras mounted around a 360-degree arrangement and top and bottom placements so that the multiple cameras can provide a complete view of an environment. For example, if the mobile camera 100 is mounted on a drone, it may have six cameras mounted at a front position, a back position, a left position, a right position, a top position, and a bottom position. In some examples, a single or multiple low-resolution and/or low-power cameras can be connected to the mobile camera 100 through a length of cable for use in applications that require inserting, feeding, or telescoping a camera through an aperture or passageway that is inaccessible by the mobile camera 100 in its entirety. Such an example application is a medical application in which a doctor needs to feed cameras into the body of a patient for further investigation, diagnosis, and/or surgery.

The example IMU 104 of FIGS. 1A and 1B is an electronic device that measures and reports movements in three-dimensional (3D) space associated with a carrier (e.g., a person, object, drone, UAV, vehicle, etc.) of the mobile camera 100 such as force, angular rate, and/or surrounding magnetic field. To measure such movements, the example IMU 104 may be in circuit with one or more motion sensors 158 (FIG. 1B) such as one or more accelerometers, one or more gyroscopes, one or more magnetometers, etc. The example AC 106 can be used to detect ambient sounds including speech generated by a person carrying the mobile camera 100 and/or generated by persons in proximity to the mobile camera 100. To detect such sounds, the AC 106 may be in circuit with one or more microphones 162 (FIG. 1B). In other examples, other sensor interfaces may be provided to monitor for other environmental characteristics. For example, the mobile camera 100 may additionally or alternatively be provided with a temperature sensor interface, a pressure sensor interface, a humidity sensor interface, a radiation sensor interface, a wind sensor interface, a period movement sensor interface, an abrupt movement sensor interface, an air quality sensor interface, a particulates sensor interface, a pH sensor interface, etc. The example mobile camera 100 may be provided with any suitable sensors to measure or monitor any environmental characteristics in home, commercial, and/or industrial environments.

The example VPU 108 is provided to perform computer vision processing to provide visual awareness of surrounding environments. The example VPU 108 also includes capabilities to perform motion processing and/or audio processing to provide motion awareness and/or audio awareness. For example, the VPU 108 may interface with multiple sensors or sensor interfaces, including the cameras 102, the IMU 104, the motion sensors 158, the AC 106, and/or the microphone 162 to receive multiple sensor input data. The example VPU 108 of FIG. 1A is provided with one or more convolutional neural network (CNN) feature analyzers 114, one or more computer vision (CV) analyzers 116, and/or one or more audio digital signal processors (DSPs) 118 to process such sensor input data as described below in connection with FIGS. 5A and 5B. In this manner, the example VPU 108 can perform visual processing, motion processing, audio processing, etc. on the sensor input data from the various sensors to provide visual awareness, motion awareness, and/or audio awareness. The VPU 108 of the illustrated example may be implemented using a VPU from the Myriad™ X family of VPUs and/or the Myriad™ 2 family of VPUs designed and sold by Movidius™, a company of Intel Corporation. Alternatively, the example VPU 108 may be implemented using any other suitable VPU.

In the illustrated example, the VPU 108 processes pixel data from the cameras 102, motion data from the IMU 104, and/or audio data from the AC 106, and generates sensor-based metadata describing such sensor data. By generating such sensor-based metadata, the mobile camera 100 can communicate the sensor-based metadata to a host device (e.g., a mobile phone 202 of FIG. 2) and/or a cloud service (e.g., provided by the cloud system 206 of FIG. 2) for processing instead of communicating the raw sensor data (e.g., the pixel data, the audio data, and/or the motion data). In this manner, in terms of visual captures, identities or privacies of individuals and/or private/personal property appearing in visual captures are not inadvertently exposed to other networked devices or computers connected to the Internet that may maliciously or inadvertently access such visual captures during transmission across the Internet. Such privacy protection associated with transmitting metadata instead of raw visual captures is useful to provide mobile cameras that comply with government and/or industry regulations regarding privacy protections of personal information. An example of such a government regulation of which compliance can be facilitated using examples disclosed herein is the European Union (EU) General Data Protection Regulation (GDPR), which is designed to harmonize data privacy laws across Europe, to protect and empower all EU citizens regarding data privacy, and to reshape the way organizations across the EU region approach data privacy. In addition, sending small-sized metadata, which can be encrypted and coded for additional security, significantly reduces power consumption that would otherwise be needed for transmitting the raw sensor data.

In some examples, mobile cameras disclosed herein may operate in an image/video output mode in which the mobile cameras output visual captures for storing at a host device and/or at a cloud service. In this manner, users may use the mobile camera 100 to generate picture and/or video memories for long-term storage and subsequent viewing by them and/or others that have been granted access privileges. Example mobile cameras disclosed herein may be provided with a user-controllable or system-controllable setting to set when a mobile camera is to operate in a metadata output mode or in an image/video output mode.

The example wireless communication interface 110 of FIGS. 1A and 1B may be implemented using any suitable wireless communication protocol such as the Wi-Fi wireless communication protocol, the Bluetooth® wireless communication protocol, the Zigbee® wireless communication protocol, etc. The wireless communication interface 110 may be used to communicate with a host device (e.g., one of the mobile phone host devices 202 of FIG. 2) and/or other mobile cameras via client/server communications and/or peer-to-peer communications.

Figure 2:
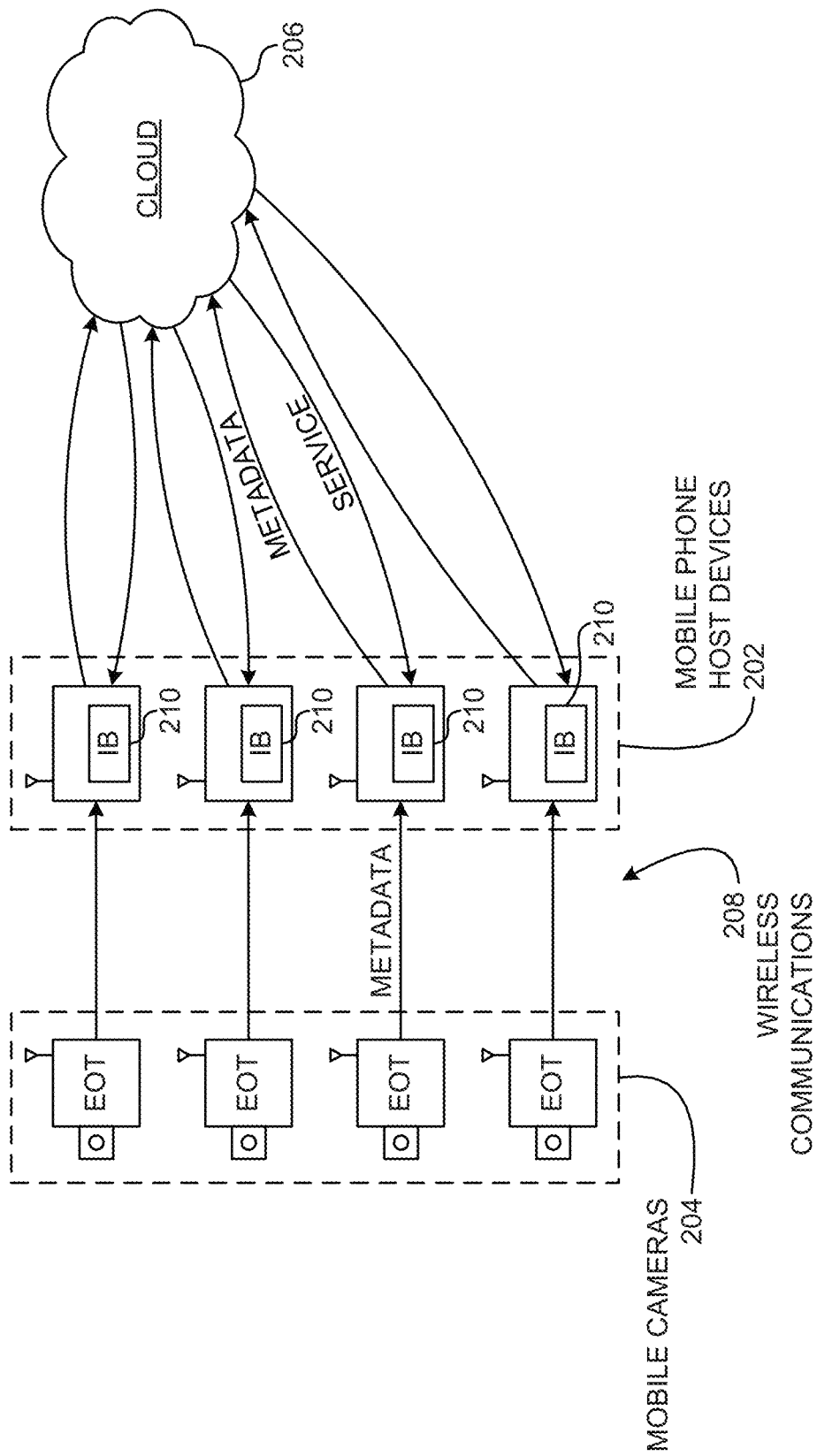
FIG. 2 illustrates example mobile phone host devices in wireless communication with corresponding mobile cameras and a cloud system.

FIG. 2 illustrates example mobile phone host devices 202 in wireless communication with corresponding example mobile cameras 204 and an example cloud system 206. In the illustrated example of FIG. 2, the mobile phone host devices 202 serve as host devices to receive information from and send information to the example mobile cameras 204. The mobile phone host devices 202 also communicatively connect the mobile cameras 204 to a cloud service provided by the cloud system 206. Although the host devices 202 are shown as mobile phones, in other examples host devices 202 may be implemented using any other type of computing device including smartwatch or other wearable computing devices, tablet computing devices, laptop computing devices, desktop computing devices, Internet appliances, Internet of Things (IoT) devices, etc. The example mobile cameras 204 are substantially similar or identical to the mobile camera 100 of FIGS. 1A and 1B.

In the illustrated example of FIG. 2, the mobile cameras 204 wirelessly communicate with their corresponding mobile phone host devices 202 using wireless communications 208 via wireless communication interfaces such as the wireless communication interface 110 of FIGS. 1A and 1B. In addition, the example mobile phone host devices 202 communicate wirelessly with the cloud system 206 via, for example, a cellular network, a Wi-Fi, or any other suitable wireless communication means. In any case, the mobile phone host devices 202 and the cloud system 206 communicate via a public network such as the Internet and/or via a private network. In some examples, the mobile cameras 204 may be configured to communicate directly with the cloud system 206 without an intervening host device 202. In yet other examples, a host device 202 may be combined with a mobile camera 204 in a same device or housing.

The example cloud system 206 is implemented using a plurality of distributed computing nodes and/or storage nodes in communication with one another and/or with server hosts via a cloud-based network infrastructure. The example cloud system 206 provides cloud services to be accessed by the mobile phone host devices 202 and/or the mobile cameras 204. Example cloud services may include metadata processing and information retrieval services to analyze and recognize metadata generated by the mobile cameras 204 and/or the mobile phone host devices 202, and retrieve information from storage devices corresponding to the metadata. The cloud system 206 can communicate such retrieved information to the mobile phone host devices 202 for use by the mobile phone host devices 202 and/or the mobile cameras 204 and/or for viewing by users of the mobile phone host devices 202. Example cloud services may additionally or alternatively include image storage and/or video storage services to store visual captures from the mobile cameras 204. In some examples, the cloud system 206 may be replaced by a server-based system and/or any other network-based system in which the mobile phone host devices 202 communicate with central computing and/or storage devices of the network-based system.

The example mobile cameras 204 and the mobile phone host devices 202 are logically located at an edge of a network since they are the endpoints of data communications. In the illustrated example, sensor-based metadata and/or visual captures from the mobile cameras 204 may be stored and/or processed at the edge of the network (e.g., by the mobile cameras 204 and/or by the corresponding mobile phone host devices 202) and/or at the cloud system 206. Processing visual captures at the edge of the network instead of at the cloud system 206 offloads processing requirements from the cloud system 206. For example, processing requirements for computer vision analyses are distributed across multiple mobile cameras 204 and/or mobile phone host devices 204 so that each mobile camera 204 and/or mobile phone host device 202 can use its processing capabilities for computer vision analyses of visual captures and generate metadata so that the cloud system 206 need not be equipped with the significant additional CPU (central processing unit) resources, GPU (graphic processing unit) resources, and/or memory resources required to perform such computer vision analyses for a large number of visual captures received from a large number of networked mobile cameras 204. In addition, computer vision analyses can be done faster when performed in parallel at distributed mobile cameras 204 rather than performed in seriatim in a central location such as the cloud system 206.

In some examples, the mobile cameras 204 are concurrently used in different environments and communicate sensor-based metadata and/or visual captures to the cloud system 206 based on those different environments. In other examples, two or more of the mobile cameras 204 operate in a same environment such that they can produce visual captures from different perspectives or different fields of view of the same environment. In such examples, the visual captures from the different mobile cameras 204, when considered in the aggregate, form a panoramic view of the environment or form an otherwise more expansive view of the environment than can be covered by any single one of the visual captures from a single mobile camera 204. In yet other examples, a single mobile camera 204 is provided with multiple cameras as described above in connection with FIGS. 1A and 1B to provide a panoramic or more expansive view of its environment.

In the illustrated example, each mobile camera 204 is physically separate from its corresponding mobile phone host device 202 so that the mobile camera 204 can be worn by a person while the mobile phone host device 202 can be stowed away in a purse, a bag, and/or a pocket. This eliminates the need for a person using such a camera to pull out their mobile phone to capture images or video since such visual captures can be made by the mobile camera 204. In addition, such arrangement is useful to assist people as they navigate throughout their different environments. For example, a person may be viewing their mobile phone while walking along a busy sidewalk. To prevent the person's distractedness from creating a dangerous situation, the mobile camera 204 may operate as another set of eyes to identify other upcoming people, vehicles, or other obstacles and warn the person of those surrounding elements. As such, example mobile cameras disclosed herein may operate as an "eyes always on the world" device to provide supplemental information to users about their surroundings. For example, a mobile camera 204 may perform computer vision analyses on a stream of visual captures as a person walks along the sidewalk to generate metadata identifying an approaching curb of the sidewalk by detecting a corresponding image feature such as an image of the curb, an edge of the curb, a line of the curb, etc. The mobile camera 204 may generate curb-warning metadata and communicate such metadata to a corresponding mobile phone host device 202 or other wearable device (e.g., smart glasses, an assistive device, etc.). The mobile phone host device 202 may handle the curb-warning metadata by emitting an audible warning and/or displaying a notification to the person indicating that the person should be cautious of the curb and/or an approaching vehicle beyond the curb. In some examples, stereoscopic images and/or video captured by the mobile camera 204 may be used to determine distances between the person and approaching obstacles (e.g., the vehicle or the curb) and/or speeds at which the person is becoming closer to the approaching obstacles. Such distance and/or speed information can be provided to the person via the person's mobile phone host device 202 or other computing device such as a wearable device.

In some examples, the mobile cameras 204 may be used to identify other people and/or other features of interest within visual proximity of the mobile cameras 204. In such examples, the mobile cameras 204 may be worn on lapels, shirts or at some location on persons carrying the mobile cameras 204. For example, a mobile camera 204 may be worn by a person at a conference or tradeshow in which numerous other people are in attendance and at which numerous facilities (e.g., cafeteria, phone charging stations, conference rooms, restrooms, etc.) and/or vendor booths are available. The person may recognize another attendee but not remember the name of the attendee or other information about the attendee (e.g., name, title, employer, last meeting, last interaction, last communication, etc.). In such a situation, the mobile camera 204 proactively generates and analyzes visual captures of the other attendee, and communicates with a cloud service hosted by the cloud system 206 to obtain pertinent information about the other attendee for access by the person wearing the mobile camera 204. This information about the attendee may be useful to refresh the person's memory about the attendee and/or to newly inform the person about the attendee so that the person may make a more informed and relevant introduction with the attendee. In some examples, the associated mobile phone host device 202 generates an alert (e.g., an audible alert, a vibrating alert, a display notification, etc.) notifying the person when the information about the attendee has been received from the cloud service. In this manner, the person need not expend effort and time to actively send requests for information. Instead, the mobile camera 204, the mobile phone host device 202, and the cloud system 206 operate without user intervention to provide such information.

In some examples, the cloud service provided by the cloud system 206 is a social network service (e.g., Facebook, Twitter, etc.) or a business network service (e.g., LinkedIn) having registered subscribers, profile information about those subscribers, calendar information about those subscribers, email and instant messaging information about those subscribers, etc. In this manner, when the cloud service receives sensor-based metadata and/or visual captures generated by the mobile cameras 204, the cloud service can leverage such subscriber information to provide relevant information about the people represented in the sensor-based data and/or visual captures. In other examples, the cloud service communicates with other subscriber-model services such as social network service or business network services to access such subscriber information in accordance with permissions granted by those subscribers for providing access to their subscriber information.

In some examples, the mobile cameras 204 may also be used to recognize and access information about non-human objects. For example, the mobile cameras 204 may be used by patrons in an art museum to recognize different pieces of art, retrieve information (e.g., artwork name, artist name, creation date, creation place, etc.) about such art from the cloud service and access the retrieved information via the mobile phone host devices 202.

In examples disclosed herein, the mobile phone host devices 202 are provided with example information brokers (IBs) 210 to transfer information between mobile cameras 204 and a cloud service provided by the cloud system 206. In the illustrated example, the information brokers 210 are implemented using an MQTT (Message Queue Telemetry Transport) protocol. The MQTT protocol is an ISO standard (ISO/IEC PRF 20922) publish-subscribe-based messaging protocol that works on top of the TCP/IP protocol. In examples disclosed herein, the MQTT protocol can be used as a lightweight messaging protocol for small sensors (e.g., the mobile cameras 204) and mobile devices (e.g., the mobile phone host devices 202) to handle communications for high-latency and/or unreliable networks. In this manner, examples disclosed herein can employ the MQTT protocol as a low-power and low-bandwidth protocol to maintain efficient and reliable communications between the mobile cameras 204 and the mobile phone host devices 202 using peer-to-peer (P2P) communications and/or for exchanging information such as metadata and/or visual captures with cloud services or other networked devices. Using the information brokers 210, lightweight communications can be used to send lightweight data (e.g., metadata extracted by the mobile cameras 204 from visual captures) from the mobile cameras 204 and/or the mobile phone host devices 202 to a cloud service. In such examples, the mobile cameras 204 can process visual captures at the edge of a network and consume fewer amounts of network bandwidth to transfer resulting metadata to a cloud service.

Figure 3:
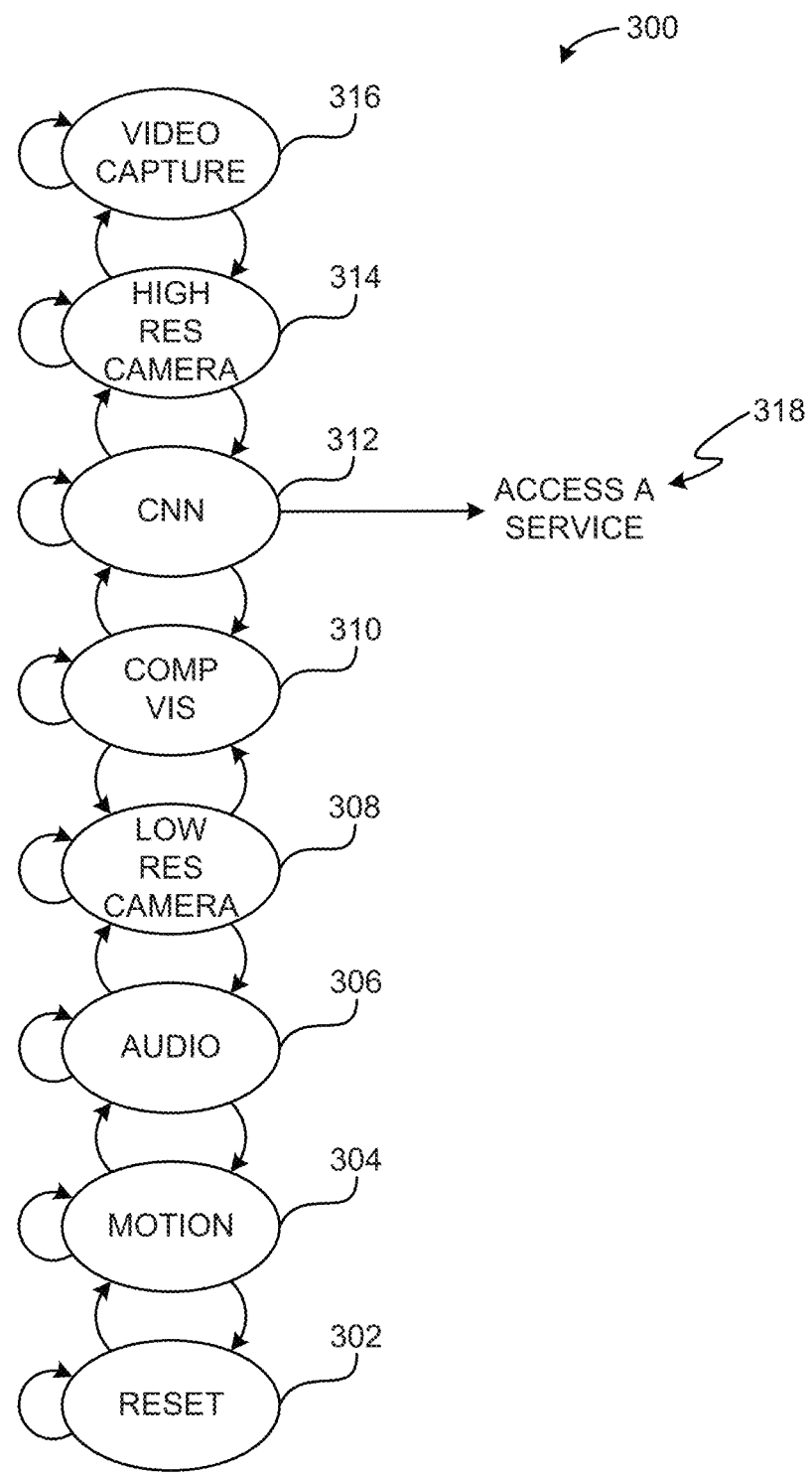
FIG. 3 illustrates an example multiple power-level operating state hierarchy for use with the mobile cameras of FIGS. 1A, 1B, and 2.

FIG. 3 illustrates an example multiple power-level operating state hierarchy 300 for use with the mobile cameras 100, 204 of FIGS. 1A, 1B, and 2. The example multiple power-level operating state hierarchy 300 can be used to enable low power usage for the mobile cameras 100, 204 and, thus, conserve battery charge. The example multiple power-level operating state hierarchy 300 enables low power usage based on the premise that, much of the time, the example mobile cameras 100, 204 are not performing compute-intensive processes and/or collecting high-quality visual captures. For example, in a low-power feature monitoring mode, a mobile camera 100, 204 may monitor motion sensor data, audio sensor data and/or low-resolution visual captures (e.g., performing CNN inference processes) to identify trigger features that could cause the mobile camera 100, 204 to transition to one or more higher power modes.

In some examples, the multiple power-level operating state hierarchy 300 can be used to control the power-on or active state of a wireless communication subsystem (e.g., the wireless communication interface 110 of FIGS. 1A and 1B) of a mobile camera 100, 204. For example, at lower power states of the multiple power-level operating state hierarchy 300, the mobile camera 100, 204 may refrain from generating metadata needing to be communicated to a cloud service provided by the cloud system 206. In such scenarios, the wireless communication interface 100 can be kept in a low-power mode to conserve battery power.

The operating states of the example multiple power-level operating state hierarchy 300 include an example reset state 302, an example motion feature detection state 304, an example audio feature detection state 306, an example low-resolution camera feature detection state 308, an example computer vision processing feature detection state 310, an example CNN feature detection state 312, an example high-resolution camera feature detection state 314, and an example video capture state 316.

Figure 4:
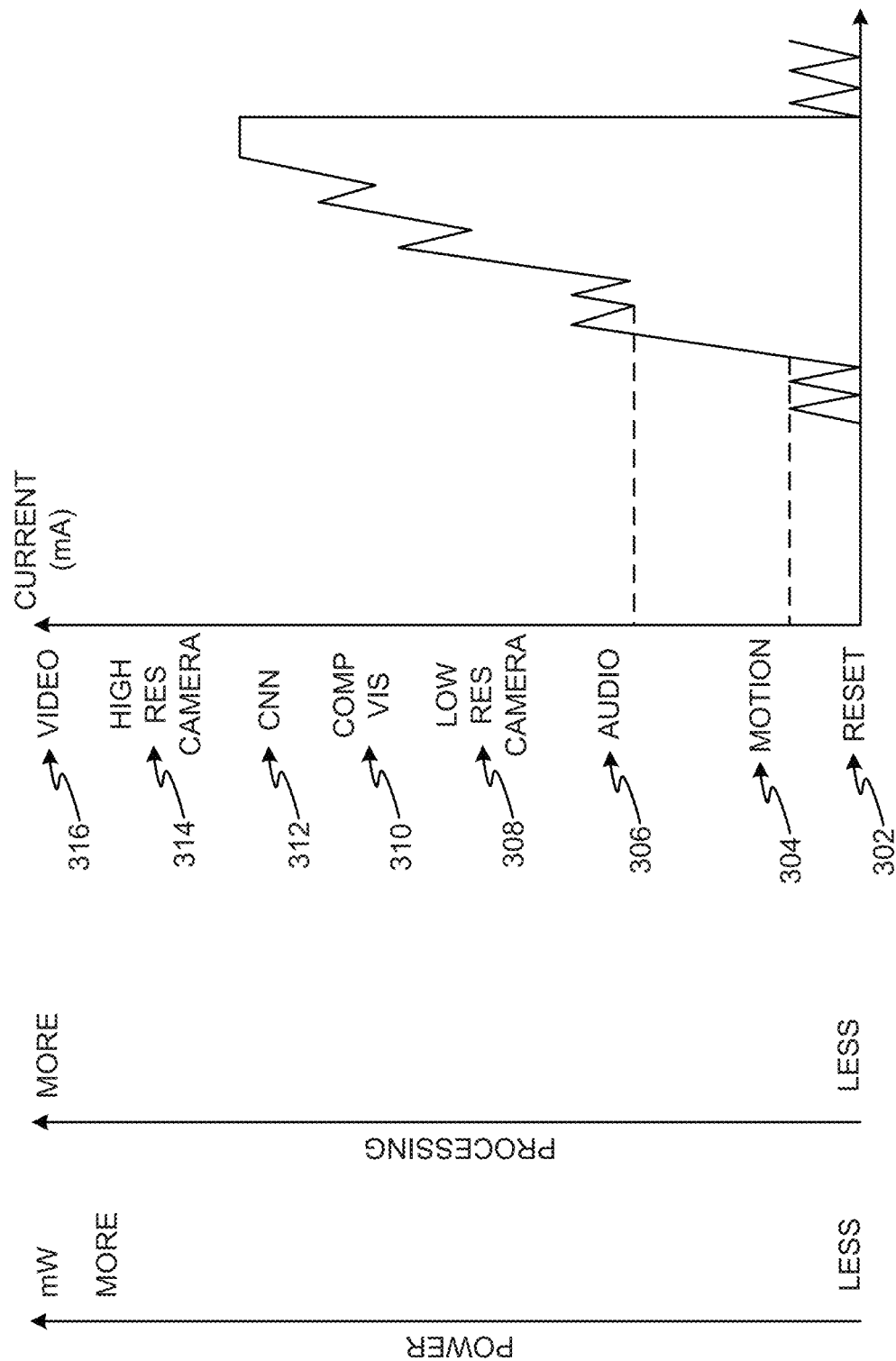
FIG. 4 illustrates a line graph of example power usage by the mobile cameras of FIGS. 1A, 1B, and 2 at the different power-level operating states of FIG. 3.

FIG. 4 illustrates an example power usage trend of the mobile camera 100, 204 that depicts relative power usage between the different power states 302, 304, 306, 308, 310, 312, 314, and 316. In the illustrated example of FIG. 4, the lowest power state is the reset state 302, and the highest power state is the video capture state 316. As the mobile camera 100, 204 progresses along the different power states 302, 304, 306, 308, 310, 312, 314, and 316 from the reset state 302 to the video capture state 316, processing resources and electrical current drawn by the subsystems of the mobile camera 100, 204 increase which, in turn, increases power consumption.

In the example reset state 302, much of the mobile camera 100, 204 is in a low-power mode in which only a small amount of electrical power is used to power system-critical components such as a real-time clock to maintain system time, external interrupt inputs to respond to sensor-based wakeup events, a watchdog timer to schedule periodic or aperiodic wakeup events, etc., while other subsystems are in a low-power standby mode. During wakeup events, the mobile camera 100, 204 may analyze input sensor data to identify trigger features that cause the mobile camera 100, 204 to transition to higher power states. In examples disclosed herein, trigger features that cause the mobile camera 100, 204 to transition between the different power states of the multiple power-level operating state hierarchy 300 may be detected by the IMU 104, the AC 106, and/or the VPU 108, and/or may be detected by monitoring circuits provided in intelligent sensors that are in circuit with sensor interfaces of the IMU 104, the AC 106, and/or the VPU 108. For example, small amounts of power (e.g., ~2 milliwatts) may be provided (e.g., periodically or aperiodically) to the IMU 104, the AC 106, and/or the VPU 108 to process sensor data from corresponding sensors to identify trigger features. Alternatively, small amounts of power (e.g., ~2 milliwatts) may be provided (e.g., periodically or aperiodically) to monitoring circuits in the intelligent sensors so that the monitoring circuits can analyze sensor data generated by the sensors to identify trigger features. In such examples, upon detecting trigger features, sensors may send external interrupts to corresponding sensor subsystems (e.g., the IMU 104, the AC 106, and/or the VPU 108) to wake up the sensor subsystems and initiate transitions between the different power states of the multiple power-level operating state hierarchy 300.

An example usage scenario of power state transitions involves a person wearing a mobile camera 100, 204. When the person is inactive such as standing still, sitting, or sleeping, the mobile camera 100, 204 may enter the reset state 302 as a result of the mobile camera 100, 204 not detecting any motion associated with the person. However, when the person moves, the mobile camera 100, 204 may incrementally enter into higher power states (e.g., the motion feature detection state 304, the audio feature detection state 306, etc.) based on the amount of motion detected by the mobile camera 100, 204. For example, a person may begin walking which causes the mobile camera 100, 204 to enter the audio feature detection state 306 and begin analyzing audio sensor data representative of surrounding speech, sound, noise, etc. and/or at some point the mobile camera 100, 204 may transition into the low-resolution camera feature detection state 308 to analyze low-resolution visual captures of surrounding areas. In the audio feature detection state 306, the mobile camera 100, 204 may monitor for the presence of, for example, other people by recognizing speech. In the example low-resolution camera feature detection state 308, the mobile camera 100, 204 may monitor for the presence of, for example, other people or other features of interest based on visual confirmations. In some examples, the mobile camera 100, 204 may skip one or more operating states to move to higher or lower power states along the multiple power-level operating state hierarchy 300. For example, detecting a running motion in the motion feature detection state 304 may cause the mobile camera 100, 204 to transition from the motion feature detection state 304 to the low-resolution camera feature detection state 308 and/or to the video capture state 316. In such an example, the low-resolution feature detection state 308 may be used to analyze images of distant objects that a person carrying the mobile camera 100, 204 may quickly approach due to the running activity. The low-resolution feature detection state 308 would be more suitable for detection than the audio feature detection state 306 due to the distance of far away objects and/or due to noisy wind, breathing, shoe, or friction sounds generated while running. The example video capture state 316 may be activated during such detected running to record video for safety purposes and/or if the person has preconfigured the mobile camera 100, 204 to record runs for personal video purposes. When the running activity stops, the mobile camera 100, 204 may transition by skipping multiple operating states down the multiple power-level operating state hierarchy 300, for example, from the video capture state 316 directly to the reset state 302.

In the example multiple power-level operating state hierarchy 300 of FIG. 3, during wakeup events from the reset state 302, the mobile camera 100, 204 can provide a small amount of electrical power to a motion sensor interface of the IMU 104 (FIG. 1A) to receive motion sensor data via one or more motion sensors of the mobile camera 100, 204. In the motion feature detection state 304, the example IMU 104 can measure or analyze the motion activity represented by the motion sensor data to identify a motion feature trigger. For example, a motion feature trigger could be a threshold amount of motion activity that causes the mobile camera 100, 204 to remain in the motion feature detection state 304 or transition to the audio feature detection state 306. When the IMU 104 does not detect a certain amount of threshold motion activity during the motion feature detection state 304 to remain in the motion feature detection state 304 or to enter the audio feature detection state 306, the mobile camera 100, 204 returns to the reset state 302. In some examples, the mobile camera 100, 204 stays in the motion feature detection state 304 when the IMU 104 detects a first amount of threshold motion activity and enters the audio feature detection state 306 when the IMU 104 detects a second amount of threshold motion activity. For example, the first amount of threshold motion activity could be sufficient activity that warrants staying in the motion feature detection state 304 to continue monitoring motion activity that could lead to satisfying the second amount of threshold motion activity to transition to the audio feature detection state 306. The amounts of threshold motion activity may be magnitudes of motion and/or durations of motion.

In the example audio feature detection state 306, the mobile camera 100, 204 provides power to the audio codec 106 to receive audio sensor data from, for example, a microphone. In this manner, the mobile camera 100, 204 can analyze the audio sensor data to identify audio feature triggers (e.g., speech, sound, noise, a dog bark, a cat meow, a door opening, a door closing, a car engine sound, etc.). In some examples, an audio feature trigger is based on a rate of change in an audio signal (e.g., an abrupt sound feature). In some examples in which the mobile camera 100, 204 monitors for the presence of people, when the mobile camera 100, 204 identifies particular speech (e.g., words and/or phrases based on speech recognition) and/or identifies a particular speaker (e.g., based on speaker recognition), the mobile camera 100, 204 transitions to the low-resolution camera feature detection state 308.

In the example low-resolution camera feature detection state 308, the mobile camera 100, 204 powers a camera interface of the VPU 108 (FIGS. 1A and 1B) to receive low-resolution visual captures from a low-resolution camera 102a,b (FIGS. 1A and 1B). In some examples, the low-resolution camera 102a,b is provided with motion detection capabilities. In this manner, the VPU 108 may remain in a low-power state until the low-resolution camera 102a,b detects a threshold amount of visual motion (e.g., a visual feature trigger) that warrants notifying the VPU 108 to transition into a higher power operating state. Detecting sufficient visual motion may be based on whether there is sufficient lighting for capturing images having sufficient visibility of the surroundings to be adequately processed by the VPU 108. In such examples, when lighting is low, the mobile camera 100, 204 may remain in the low-resolution camera feature detection state 308 or return to the audio feature detection state 306. As such, the mobile camera 100, 204 can conserve battery power by limiting power to the VPU 108 until a visual feature trigger is detected by the low-resolution camera 102a,b.

When the example low-resolution camera 102a,b detects a visual feature trigger, the mobile camera 100, 204 may transition into the computer vision processing feature detection state 310. In the computer vision processing feature detection state 310, the VPU 108 may analyze visual captures from the low-resolution camera 102a,b to detect whether a person is within visual proximity of the low-resolution camera 102a,b. When a face feature in a visual capture from the low-resolution camera 102a,b satisfies a face feature threshold, the mobile camera 100, 204 transitions to the CNN feature detection state 312. In the example CNN feature detection state 312, an example CNN feature analyzer 114 (FIG. 1A) of the VPU 108 performs computer vision analyses on the detected face. The example CNN feature analyzer 114 may compare the detected face to a database or dictionary of reference face images or reference face metadata stored locally in the mobile camera 100, 204 and/or in a corresponding mobile phone host device 202 (FIG. 2). If the CNN feature analyzer 114 determines that the detected face matches one of the reference face images, the mobile camera 100, 204 may access a service 318 (e.g., via the cloud system 206 of FIG. 2) to obtain information about the person corresponding to the detected face. Additionally or alternatively, the mobile camera 100, 204 may transition to the example high-resolution camera feature detection state 314 to capture a still image of the person corresponding to the detected face and/or may transition to the example video capture state 316 to capture video of the person corresponding to the detected face.

In the illustrated example of FIG. 3, transitioning between the different states of the multiple power-level operating state hierarchy 300 may be based on policies or rules stored in the mobile cameras 100, 204 and/or stored in corresponding mobile phone host devices 202 (FIG. 2) for access by the mobile cameras 100, 204. In some examples, the policies for transitioning between the different operating states cause the mobile camera 100, 204 to remain in the reset state 302 or relatively lower power operating states (e.g., the motion feature detection state 304, the audio feature detection state 306, the low-resolution camera feature detection state 308) for a majority of the time such that the mobile camera 100, 204 consumes relatively little power. The mobile camera 100, 204 can then transition, from time to time, to operating states that contribute to relatively higher power consumption only when necessary to collect high-resolution visual captures and/or to access an external service via wireless communications. By transitioning to such higher power operating states for only short durations, examples disclosed herein enable keeping higher power consumption subsystems (e.g., the high-resolution cameras 102c,d of FIGS. 1A and 1B and the wireless communication interface 110 of FIGS. 1A and 1B) off most of the time until needing to be used in such higher power operating states. In this manner, the mobile camera 100, 204 can be used for a relatively long time (e.g., days or weeks) between battery charges or battery replacements.

In some examples, the different states of FIG. 3 are used by the mobile camera 100, 204 to modulate its operation between the different operating states based on remaining battery power and desired minutes of remaining operation. For example, the mobile camera 100, 204 enters a battery-critical mode and operates at lower power states (e.g., the motion feature detection state 304, the audio feature detection state 306, the low-resolution camera feature detection state 308) without entering higher power states when the remaining battery charge of the mobile camera 100, 204 is low and a desired duration of remaining operation requires less power usage than possible in the higher power states. In this manner, the mobile camera 100, 204 can continue monitoring its surroundings for features of interest and can continue to collect and store the occurrences of such features of interest without entering the higher power states. For example, in the battery-critical mode, the mobile camera 100, 204 could define the low-resolution camera feature detection state 308 as a maximum state and use the low-resolution camera feature detection state 308 to collect visual captures instead of transitioning into the high-resolution camera feature detection state 314.

In the battery-critical mode, policies for transitioning between the different operating states of FIG. 3 may also be adapted so that the mobile camera 100, 204 operates in a more power-conservative manner. For example, when the mobile camera 100, 204 is not in the battery-critical mode, a policy for transitioning from the motion feature detection state 304 to the audio feature detection state 306 may be that the IMU 104 must detect any motion in any direction, while when operating in the battery-critical mode, the policy for transitioning from the motion feature detection state 304 to the audio feature detection state 306 may change to require, for example, a detected change in direction of 90 degrees, 180 degrees, etc. In this manner, to further conserve power during the battery-critical mode, the mobile camera 100, 204 can remain in lower power states unless it detects feature triggers that are relatively more significant than would be required when not operating in the battery-critical mode.

Although the different operating states of the example multiple power-level operating state hierarchy 300 of FIG. 3 are shown in a particular order, policies for transitioning between the different operating states may define different orders for transitions between the different operating states. For example, a small amount of movement detected by the IMU 104 may satisfy a low-movement feature detection threshold to transition from the motion feature detection state 304 to the audio feature detection state 306, while a more significant amount of movement detected by the IMU 104 may satisfy a high-movement feature detection threshold to transition from the motion feature detection state 304 to the low-resolution camera feature detection state 308. In addition, although the example multiple power-level operating state hierarchy 300 of FIG. 3 shows a transition from the reset state 302 to the motion feature detection state 304 during wakeup events, a different wakeup policy may instead be applied to transition the mobile camera 100, 204 from the reset state 302 to the audio feature detection state 306 during such wakeup events and/or to transition from the reset state 302 to both the motion feature detection state 304 and the audio feature detection state 306 simultaneously. Similarly, in other examples, the mobile camera 100, 204 may be provided with policies that define transitions from one operating state to multiple operating states simultaneously and/or from multiple operating states in which the mobile camera 100, 204 is simultaneously operating to a single operating state. Policies for controlling operating states and/or transitions between the operating states may be user defined (e.g., via the mobile phone host devices 202 of FIG. 2) and/or system defined (e.g., programmed and/or stored in a configuration file by a developer or manufacturer).

In addition, the example multiple power-level operating state hierarchy 300 of FIG. 3 may be modified to include fewer or more and/or different operating states than those illustrated in FIG. 3. In some examples, the operating states and activations of corresponding sensors are rearranged in the multiple power-level operating state hierarchy 300 so that transitions along the multiple power-level operating state hierarchy 300 cause a different sequence of activations of the corresponding sensors. For example, the low-resolution camera feature detection state 308, the high-resolution camera feature detection state 314, and the example video capture state 316 may be rearranged so that the ordering in which each of those states is activated along the multiple power-level operating state hierarchy 300 is different. For example, one or more of the high-resolution cameras 102c,d may be activated during the high-resolution camera feature detection state 314 before activating the low-resolution cameras 102a-b during the low-resolution camera feature detection state 308. In some examples, the ordering of the operating states of the multiple power-level operating state hierarchy 300 is static and unchangeable. In other examples, the ordering of the operating states of the multiple power-level operating state hierarchy 300 is dynamic so that it may be changed using, for example, policy definitions.

Figure 5A:
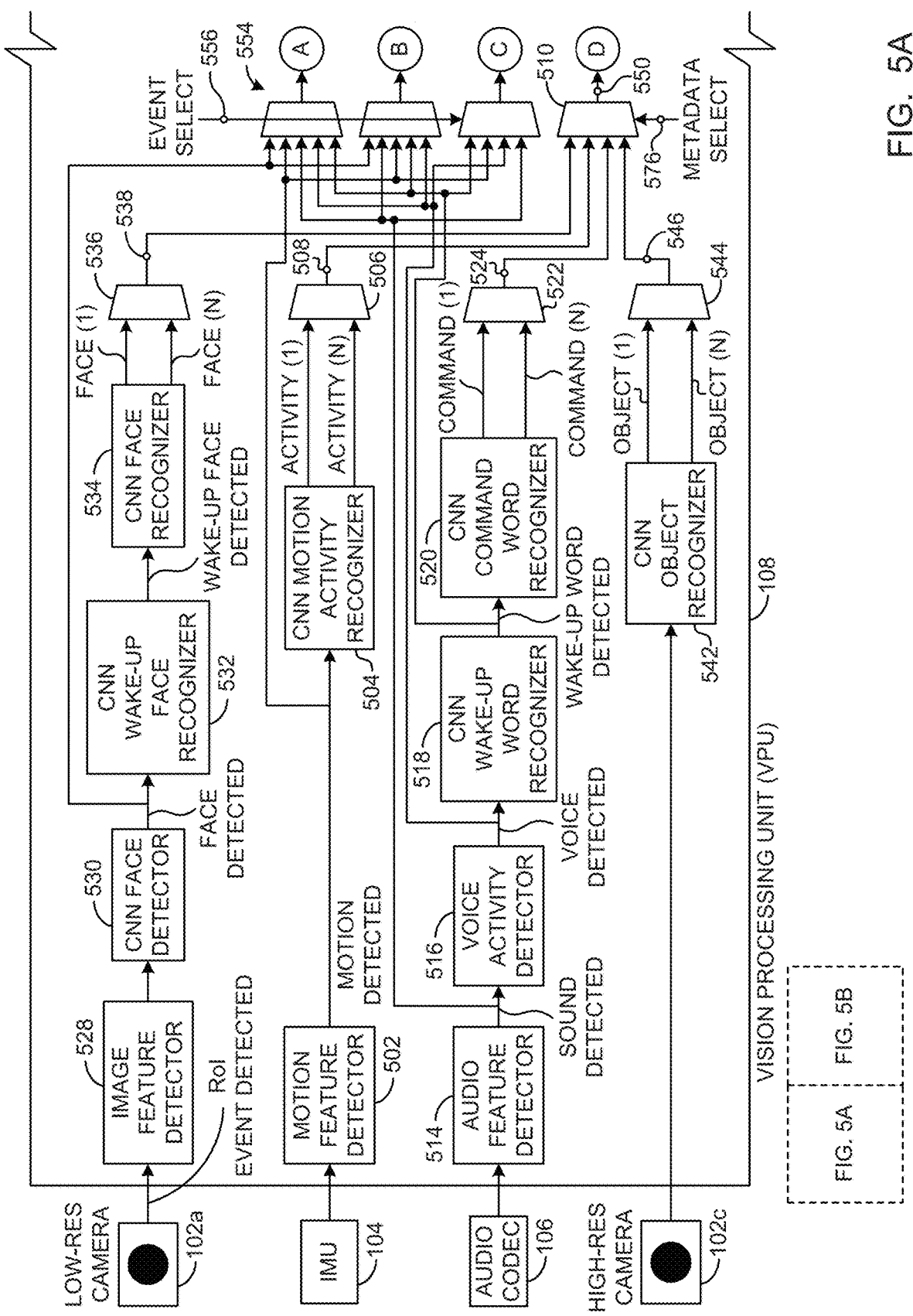
FIGS. 5A and 5B depict an example implementation of the vision processing unit (VPU) of FIGS. 1A and 1B that may be used in the mobile cameras of FIGS. 1A, 1B, and 2 to operate at the different power-level operating states of FIG. 3 in accordance with teachings of this disclosure.
Figure 5B:
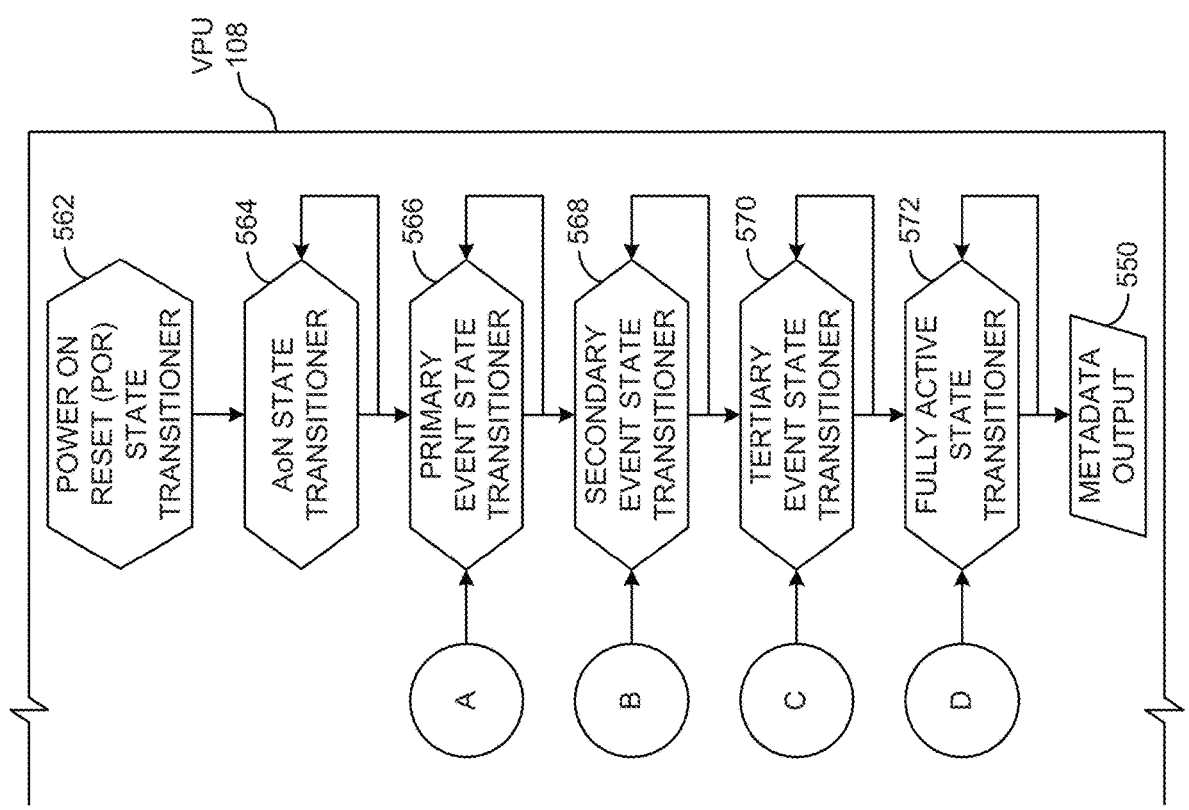

FIGS. 5A and 5B depict an example block diagram of the VPU 108 of FIGS. 1A and 1B that may be used to implement the mobile cameras 100, 204 of FIGS. 1A, 1B, and 2 to operate at the different power-level operating states of the example multiple power-level operating state hierarchy 300 of FIG. 3. The illustrated example of FIG. 5A shows the low-resolution camera 102a, the IMU 104, the audio codec 106, and the high-resolution camera 102c in circuit with the VPU 108. To perform motion analysis, audio analysis and computer vision analysis, the example VPU 108 is provided with a number of example CNN feature analyzers (e.g., that are represented in FIG. 1A as the CNN feature analyzers 114) as described below. The example CNN feature analyzers are implemented using convolutional neural networks that can be trained to detect or recognize different features (e.g., motion, audio, speech, words, persons, faces, objects, etc.) in sensor data (e.g., motion data, audio data, visual captures, etc.) provided by the IMU 104, the audio codec 106, and the cameras 102a-d. For example, the example CNN feature analyzers are trained to detect or recognize features in the sensor data by motion analysis algorithms, audio analysis algorithms, computer vision algorithms (e.g., the CV algorithms 116 of FIG. 1A) to generate probabilities representative of likelihoods that different features in the sensor data can be confirmed. In this manner, the example CNN feature analyzers can generate confirmations for presences of features of interest based on probabilities of those features satisfying feature probability thresholds.

To perform motion analysis during the motion feature detection state 304 (FIG. 3), the example VPU 108 is provided with an example motion feature detector 502 that is in circuit with the IMU 104, and an example CNN motion activity recognizer 504 that is in circuit with the motion feature detector 502. The example motion feature detector 502 is provided to detect motion activity of the mobile camera 100, 204 by receiving motion sensor data from the IMU 104, and performing motion feature detection analysis on the motion sensor data to detect movement of the mobile camera 100, 204. In the illustrated example, the example motion feature detector 502 is implemented by the DSP 118 of FIG. 1A, and the motion sensor data is raw motion sensor data representative of magnitudes and directions of motion or movement detected by the motion sensor(s) 158 (FIG. 1B) that are in circuit with the IMU 104. When the example motion feature detector 502 detects motion having sufficient magnitude and/or sufficient duration to satisfy a motion feature trigger threshold, the motion feature detector 502 sends a motion detection confirmation to the CNN motion activity recognizer 504. In addition, the motion detection confirmation causes the VPU 108 to transition to a next higher power operating state (e.g., the audio feature detection state 306 of FIGS. 3 and 4).

The example CNN motion activity recognizer 504 analyzes the motion sensor data to identify particular motion-based activity types that the CNN motion activity recognizer 504 is trained to recognize. Example motion-based activity types that may be trained into the CNN motion activity recognizer 504 include running, jumping, climbing stairs, skipping, at rest, riding in car, riding in train, etc. The example CNN motion activity recognizer 504 outputs corresponding motion metadata for different recognized activity types shown in the example of FIG. 5A as activity (1) through activity (n). In the illustrated example, the motion metadata is generated by the CNN motion activity recognizer 504 to describe the types of motion recognized in the motion sensor data (e.g., running, jumping, climbing stairs, skipping, at rest, riding in car, riding in train, etc.). In the illustrated example, the CNN motion activity recognizer 504 generates the motion metadata by accessing the metadata from a local reference motion metadata library or reference motion metadata database that stores metadata terms in association with corresponding reference motion feature definitions. To retrieve motion metadata, the CNN motion activity recognizer 504 can compare motion features from the motion sensor data with the reference motion feature definitions in the local reference motion metadata library or database. In some examples, an extended reference motion metadata library or reference motion metadata database may be stored at the cloud system 206, and accessed by the CNN motion activity recognizer 504 using an application programming interface (API) for such cloud-based library or database. The example recognized activity (1) through activity (n) cause the VPU 108 to transition to a fully awake state. In the illustrated example, a motion activity multiplexer 506 receives the motion metadata for the recognized activity (1) through activity (n), and provides the motion metadata as generally indicated by reference numeral 508 to an example full wake-up event multiplexer 510.

To perform audio analysis during the audio feature detection state 306 (FIG. 3), the example VPU 108 is provided with an example audio feature detector 514 that is in circuit with the audio codec 106, an example voice activity detector 516 that is in circuit with the audio feature detector 514, an example CNN wake-up word recognizer 518 that is in circuit with the voice activity detector 516, and an example CNN command word recognizer 520 that is in circuit with the CNN wake-up word recognizer 518. The example audio feature detector 514 is provided to detect audio activity near the mobile camera 100, 204 by receiving audio sensor data from the audio codec 106, and performing audio feature detection analysis on the audio sensor data. In the illustrated example, the example audio feature detector 514 is implemented by the DSP 118 of FIG. 1A, and the audio sensor data is raw audio waveform data representative of audio sensed by the microphone 162 (FIG. 1B) that is in circuit with the audio codec 106. When the example audio feature detector 514 detects audio having sufficient amplitude and/or sufficient duration to satisfy an audio feature trigger threshold, the audio feature detector 514 sends a sound detection confirmation to the voice activity detector 516. In some examples, the feature trigger threshold is satisfied when the audio feature detector 514 detects a particular rate of change in an audio signal (e.g., an abrupt sound feature). The sound detection confirmation confirms the presence of sounds in the audio sensor data that should be further analyzed by the VPU 108. In the illustrated example, the sounds may be any sound or noise such as voices, handclaps, animal sounds, car horns, gunshots, etc. The example voice activity detector 516 analyzes the audio sensor data using voice feature detection analysis to determine whether any portion of it is representative of a person's voice. For example, the audio sensor data may be an audio sampling of ambient noise or sounds that are not a person's voice and/or may be an audio sampling of a person's voice with or without background noise or sounds. In any case, the example voice activity detector 516 sends a confirmation of voice detection to the CNN wake-up word recognizer 518 when a voice is detected.

The example CNN wake-up word recognizer 518 analyzes the audio sensor data to identify particular wake-up words that the CNN wake-up word recognizer 518 is trained to recognize based on speech recognition algorithms. Example wake-up words that may be trained into the CNN wake-up word recognizer 518 include persons names, home, car, outside, inside, please, want, listen, wake-up, record, capture, video, hello, hi, camera-on, camera-off, help, etc. In some examples, wake-up phrases may also be defined. The example CNN wake-up word recognizer 518 sends a wake-up word detection confirmation to the CNN command word recognizer 520 when a wake-up word is detected.

In the illustrated example, the CNN wake-up word recognizer 518 also generates audio metadata corresponding to the analyzed audio sensor data. Such audio metadata may be a name of a speaker, an age of a speaker, a gender of a speaker, type of command spoken, etc. In the illustrated example, the CNN wake-up word recognizer 518 generates the audio metadata by accessing the metadata from a local reference audio metadata library or reference audio metadata database that stores metadata terms in association with corresponding reference audio feature definitions. To retrieve audio metadata, the CNN wake-up word recognizer 518 can compare audio features from the audio sensor data with the reference audio feature definitions in the local reference audio metadata library or database. In some examples, an extended reference audio metadata library or reference audio metadata database may be stored at the cloud system 206, and accessed by the CNN wake-up word recognizer 518 using an API for such cloud-based library or database.

The example CNN command word recognizer 520 analyzes the audio sensor data to identify particular command words that the CNN command word recognizer 520 is trained to recognize based on speech recognition algorithms. In the illustrated example, command words are a subset of wake-up words such that the wake-up words cause the mobile cameras 100, 204 to transition to a higher power operating state (e.g., the low-resolution camera feature detection state 308 of FIGS. 3 and 4), but only a subset of the wake-up words also defined as command words that cause the mobile cameras 100, 204 to transition to a fully awake state and/or perform corresponding operations. Example command words that may be trained into the CNN command word recognizer 520 include wake-up, record, capture, camera-on, camera-off, help, etc. The example CNN command word recognizer 520 outputs corresponding audio metadata for different recognized command words shown in the example of FIG. 5A as command (1) through command (n). In the illustrated example, a command word multiplexer 522 receives the audio metadata for the recognized command (1) through command (n), and provides the audio metadata as generally indicated by reference numeral 524 to the example full wake-up event multiplexer 510.

To perform low-resolution image analysis during the low-resolution camera feature detection state 308 (FIG. 3), the example VPU 108 is provided with an example image feature detector 528 that is in circuit with the low-resolution camera 102a, an example CNN face detector 530 that is in circuit with the image feature detector 528, an example CNN wake-up face recognizer 532 that is in circuit with the CNN face detector 530, and an example CNN face recognizer 534 that is in circuit with the CNN wake-up face recognizer 532. The example image feature detector 528 is provided to detect visible activity near the mobile camera 100, 204 by receiving low-resolution visual captures from the low-resolution camera 102a, and performing image feature detection analyses on the low-resolution visual captures. In the illustrated example, the example image feature detector 528 is implemented by the DSP 118 of FIG. 1A, and the visual captures are in the form of pixel data (e.g., multi-bit color pixel data or multi-bit black and white pixel data). In some examples, the low-resolution camera 102a only provides visual capture data to the image feature detector 528 when the low-resolution camera 102a has performed a pre-processing feature detection process to identify whether a region of interest (RoI) event is detected. Such a RoI event may occur when there is sufficient lighting in a visual capture to discern a visibly detectable feature in the visual capture (e.g., more than just a fully saturated dark image).

When the example image feature detector 528 receives a visual capture from the low-resolution camera 102a and detects a visual feature having sufficient visual definition and/or sufficient duration to satisfy a visual feature trigger threshold, the image feature detector 528 sends an image detection confirmation to the CNN face detector 530. The image detection confirmation confirms the presence of a sufficiently visual feature in the low-resolution visual capture that should be further analyzed by the VPU 108. In the illustrated example, the visual features may be any visual feature of interest such as objects, people, vehicles, license plates, signs, etc. The example CNN face detector 530 analyzes the low-resolution visual capture using face feature detection analysis to determine whether any portion of it is representative of a face. For example, the low-resolution visual capture may include visual features that are not a person's face and/or may visual feature representative of a person's face with or without other visual features. In any case, the example CNN face detector 530 sends a confirmation of face detection to the CNN wake-up face recognizer 532 when a face is detected.

The example CNN wake-up face recognizer 532 analyzes the low-resolution visual capture to identify particular wake-up faces that the CNN wake-up face recognizer 532 is trained to recognize based on computer vision algorithms (e.g., the computer vision algorithms 116 of FIG. 1A). Example wake-up faces that may be trained into the CNN wake-up face recognizer 532 may be stored into a local reference face metadata library or reference face metadata database that stores metadata in association with corresponding reference face images or corresponding reference feature vectors of faces. The CNN wake-up face recognizer 532 may confirm a presence of a face of interest in the low-resolution visual capture by comparing the pixel-based image or feature vectors of the face in the low-resolution visual capture to reference visual feature definitions (e.g., reference face images or reference feature vectors) in the local reference image metadata library or database. In some examples, an extended reference image metadata library or reference image metadata database may be stored at the cloud system 206, and accessed by the CNN wake-up face recognizer 532 using an API for such cloud-based library or database. The example CNN wake-up face recognizer 532 sends a wake-up face detection confirmation to the CNN face recognizer 534 when a wake-up face is detected. In the illustrated example, the CNN wake-up face recognizer 532 also uses the local reference image metadata library or database and/or from the extended reference image metadata library or database at the cloud system 206 to generate face metadata corresponding to detected faces. Such face metadata may be name of a person, age of a person, gender of a person, etc.

The example CNN face recognizer 534 analyzes the visual capture to identify particular faces that the CNN face recognizer 534 is trained to recognize based on the computer vision algorithms 116. Recognition of such particular faces causes the mobile camera 100, 204 to transition to a fully awake state. In the illustrated example, faces recognized by the CNN wake-up face recognizer 532 and the CNN face recognizer 534 are a subset of faces detected by the CNN face detector 530 such that the faces detected by the CNN face detector 530 cause the mobile cameras 100, 204 to transition to a higher power operating state (e.g., the high-resolution camera feature detection state 314 of FIGS. 3 and 4), but only a subset of the detected faces cause the mobile cameras 100, 204 to transition to a fully awake state. The example CNN face recognizer 534 outputs corresponding face metadata for different recognized faces shown in the example of FIG. 5A as face (1) through face (n). In the illustrated example, a recognized face multiplexer 536 receives the face metadata for the recognized face (1) through face (n), and provides the face metadata as generally indicated by reference numeral 538 to the example full wake-up event multiplexer 510.

To perform high-resolution image analysis, the example VPU 108 is provided with an example CNN object recognizer 542 that is in circuit with the high-resolution camera 102c. The example CNN object recognizer 542 is provided to recognize objects near the mobile camera 100, 204 by analyzing high-resolution visual captures from the high-resolution camera 102c to identify particular objects that the CNN object recognizer 542 is trained to recognize based on the computer vision algorithms 116. Recognition of such objects causes the mobile camera 100, 204 to transition to a fully awake state. In the illustrated example, the CNN object recognizer 542 generates object metadata by accessing the metadata from a local reference object metadata library or reference object metadata database that stores metadata terms in association with corresponding reference object feature definitions. Example object metadata includes class of object (e.g., person, animal, natural feature, building, vehicle, etc.), vehicle (e.g., type, make, model, color, etc.), license plate (e.g., registered state, license plate number, etc.), etc. To retrieve object metadata, the CNN object recognizer 542 can compare object features from the high-resolution visual captures with the reference object feature definitions in the local reference object metadata library or database. In some examples, an extended reference object metadata library or reference object metadata database may be stored at the cloud system 206, and accessed by the CNN object recognizer 542 using an API for such cloud-based library or database. The example CNN object recognizer 542 outputs corresponding object metadata for different recognized objects shown in the example of FIG. 5A as object (1) through object (n). In the illustrated example, a recognized object multiplexer 544 receives the object metadata for the recognized object (1) through object (n), and provides the object metadata as generally indicated by reference numeral 546 to the example full wake-up event multiplexer 510.

In the illustrated example of FIG. 5A, the VPU 108 is provided with trigger feature multiplexers 554 having event select lines 556 controllable by the VPU 108 to configure what metadata provided by the components of the VPU 108 as described above are to cause the mobile cameras 100, 204 to transition between different operating states of the example multiple power-level operating state hierarchy 300 of FIG. 3. For example, as shown in FIG. 5B, to provide metadata-based wakeup events to transition between different ones of the operating states, the VPU 108 is provided with an example power on reset (POR) state transitioner 562, an example always on (AoN) state transitioner 564, an example primary event state transitioner 566, an example secondary event state transitioner 568, an example tertiary event state transitioner 570, and an example fully active state transitioner 572. In the illustrated example, the power on reset state transitioner 562 generates a wakeup event to transition the mobile camera 100, 204 out of the reset state 302 of FIGS. 3 and 4. The AoN state transitioner 564 of the illustrated example generates a wakeup event to transition the mobile cameras 100, 204 out of the low-resolution camera feature detection state 308 based on the low-resolution camera 102a (FIG. 5A) being supplied minimal electrical power to perform pre-processing feature detection processes to identify whether a region of interest (RoI) event is detected. The primary event state transitioner 566, the secondary event state transitioner 568, and the tertiary event state transitioner 570 generate wakeup events to transition the mobile camera 100, 204 between different ones of the motion feature detection state 304, the audio feature detection state 306, the low-resolution camera feature detection state 308, the computer vision processing feature detection state 310, the CNN feature detection state 312, the high-resolution camera feature detection state 314, and/or the video capture state 316 of FIGS. 3 and 4 based on different combinations of motion feature(s), audio feature(s), and/or visual feature(s) from the different components of the VPU 108 that are selected by the VPU 108 via the event select lines 556 of the trigger feature multiplexers 554. In some examples more or fewer event state transitioners may be provided to the VPU 108. In some examples, a separate state transitioner is provided for each one of the motion feature detection state 304, the audio feature detection state 306, the low-resolution camera feature detection state 308, the computer vision processing feature detection state 310, the CNN feature detection state 312, the high-resolution camera feature detection state 314, and the video capture state 316 of FIGS. 3 and 4.

In the illustrated example of FIG. 5A, the full wake-up event multiplexer 510 is provided with metadata select lines 576 that are configurable by the VPU 108 to select different combinations of input metadata corresponding to the recognized motion activity(ies), the recognized command word(s), the recognized face(s), and the recognized object(s) that are to cause the mobile cameras 100, 204 to transition to a fully awake state. For example, based on selections of the metadata select lines 576 and the input metadata to the example full wake-up event multiplexer 510, the full wake-up event multiplexer 510 provides metadata output 550. The metadata output 550 is provided to the fully active state transitioner 572 (FIG. 5B) to cause the VPU 108 to fully awake the mobile camera 100, 204. In the illustrated example, when in a fully awake state, the VPU 108 enables a communications subsystem and the wireless communication interface 110 (FIGS. 1A and 1B) to send the metadata output 550 (e.g., the metadata generally indicated by reference numerals 508, 524, 538, and/or 546) to a corresponding mobile phone host device 202 and/or the cloud system 206 (FIG. 2). The example metadata output 550 may include one or more of the metadata received at the full wake-up event multiplexer 510. For example, based on the controlling of the metadata select lines 576 of the full wake-up event multiplexer 510, the metadata output 550 may include one or more of the input metadata corresponding to the recognized motion activity(ies), the recognized command word(s), the recognized face(s), and/or the recognized object(s).

Figure 5C:
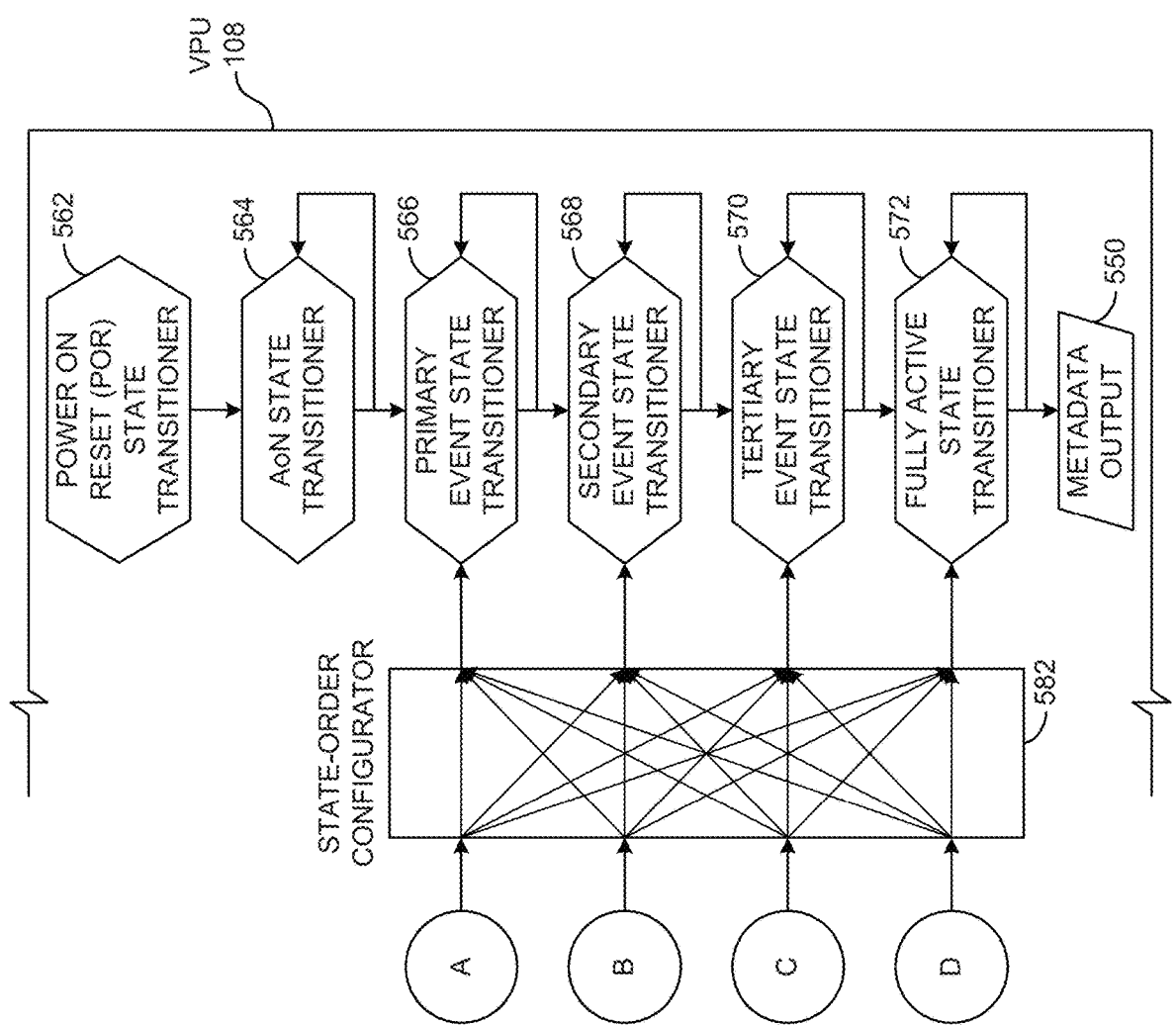
FIG. 5C depicts an example state-order configurator that may be used with the VPU depicted in FIGS. 5A and 5B to configure the ordering of the different power-level operating states of FIG. 3.

FIG. 5C depicts an example state-order configurator 582 that may be used with the VPU 108 depicted in FIGS. 5A and 5B to configure the ordering of the different power-level operating states of the example multiple power-level operating state hierarchy 300 of FIG. 3. The example state-order configurator 582 arranges and/or rearranges the operating states and activations of corresponding sensors in the multiple power-level operating state hierarchy 300 so that the example state transitioners 566, 668, 570, 572 cause different sequences of transitions between operating states and corresponding sensors along the multiple power-level operating state hierarchy 300. For example, to implement such ordering of operating states, the state-order configurator 582 is provided with configurable logic circuits to direct different ones of the inputs from the trigger feature multiplexers 554 of FIG. 5A to different ones of the example state transitioners 566, 668, 570, 572. In some examples, the state-order configurator 582 reorders the order of the different power-level operating states of the example multiple power-level operating state hierarchy 300 based on the inputs from the trigger feature multiplexers 554. For example, when a combination of events is detected within a short threshold duration, the state-order configurator 582 may control the paths between the trigger feature multiplexers 554 and the different ones of the example state transitioners 566, 668, 570, 572 to transition to a different power-level operating state than would be transitioned if such combination of events were not detected or if a different combination of events were detected. For example, in response to a detection of high-speed movement (e.g., driving a car) and a concurrent detection of a screeching sound (e.g., tires skidding), the state-order configurator 582 may control the paths between the trigger feature multiplexers 554 and the different ones of the example state transitioners 566, 668, 570, 572 to transition from the example motion feature detection state 304 to the example video capture state 316. This may be useful to capture video of an imminent vehicular accident.

In the illustrated example, the state-order configurator 582 enables the ordering of the operating states of the multiple power-level operating state hierarchy 300 to be dynamically modified. In some examples, such modifications are on policy definitions. In such examples, or other examples, such modifications implemented using firmware, software, and/or control registers. In some examples, the state-order configurator 582 enables the mobile camera 100, 204 to skip one or more operating states to move to higher or lower power states along the multiple power-level operating state hierarchy 300.

While an example manner of implementing the mobile camera 100, 204 and the VPU 108 are illustrated in FIGS. 1A, 1B, 2, 5A, 5B, and 5C, one or more of the elements, processes and/or devices illustrated in FIGS. 1A, 1B, 2, 5A, 5B, and 5C may be combined, divided, re-arranged, omitted, eliminated and/or implemented in any other way. Further, the example CNN feature analyzers 114, the example computer vision algorithms 116, and/or the example digital signal processors 118 of FIG. 1A, the example motion feature detector 502, the example CNN motion activity recognizer 504, the example motion activity multiplexer 506, the example full wake-up event multiplexer 510, the example audio feature detector 514, the example voice activity detector 516, the example CNN wake-up word recognizer 518, the example CNN command word recognizer 520, the example command word multiplexer 522, the example image feature detector 528, the example CNN face detector 530, the example CNN wake-up face recognizer 532, the example CNN face recognizer 534, the example recognized face multiplexer 536, the example CNN object recognizer 542, and/or the example trigger feature multiplexers 554 of FIG. 5A, the example POR state transitioner 562, the example AoN state transitioner 564, the example primary event state transitioner 566, the example secondary event state transitioner 568, the example tertiary event state transitioner 570, and/or the example fully active state transitioner 572 of FIG. 5B, and/or the example state-order configurator 582 of FIG. 5C, and/or, more generally, the example mobile camera 100, 204 and/or VPU 108 may be implemented by hardware, software, firmware and/or any combination of hardware, software and/or firmware. Thus, for example, any of the example CNN feature analyzers 114, the example computer vision algorithms 116, and/or the example digital signal processors 118 of FIG. 1A, the example motion feature detector 502, the example CNN motion activity recognizer 504, the example motion activity multiplexer 506, the example full wake-up event multiplexer 510, the example audio feature detector 514, the example voice activity detector 516, the example CNN wake-up word recognizer 518, the example CNN command word recognizer 520, the example command word multiplexer 522, the example image feature detector 528, the example CNN face detector 530, the example CNN wake-up face recognizer 532, the example CNN face recognizer 534, the example recognized face multiplexer 536, the example CNN object recognizer 542, and/or the example trigger feature multiplexers 554 of FIG. 5A, the example POR state transitioner 562, the example AoN state transitioner 564, the example primary event state transitioner 566, the example secondary event state transitioner 568, the example tertiary event state transitioner 570, and/or the example fully active state transitioner 572 of FIG. 5B, and/or the example state-order configurator 582 of FIG. 5C and/or, more generally, the example mobile camera 100, 204 and/or VPU 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example CNN feature analyzers 114, the example computer vision algorithms 116, and/or the example digital signal processors 118 of FIG. 1A, the example motion feature detector 502, the example CNN motion activity recognizer 504, the example motion activity multiplexer 506, the example full wake-up event multiplexer 510, the example audio feature detector 514, the example voice activity detector 516, the example CNN wake-up word recognizer 518, the example CNN command word recognizer 520, the example command word multiplexer 522, the example image feature detector 528, the example CNN face detector 530, the example CNN wake-up face recognizer 532, the example CNN face recognizer 534, the example recognized face multiplexer 536, the example CNN object recognizer 542, and/or the example trigger feature multiplexers 554 of FIG. 5A, the example POR state transitioner 562, the example AoN state transitioner 564, the example primary event state transitioner 566, the example secondary event state transitioner 568, the example tertiary event state transitioner 570, and/or the example fully active state transitioner 572 of FIG. 5B, and/or the example state-order configurator 582 of FIG. 5C is/are hereby expressly defined to include a non-transitory computer readable storage device or storage disk such as a memory, a digital versatile disk (DVD), a compact disk (CD), a Blu-ray disk, etc. including the software and/or firmware. Further still, the example mobile camera 100, 204 and/or the VPU 108 may include one or more elements, processes and/or devices in addition to, or instead of, those illustrated in FIGS. 1A, 1B, 2, 5A, 5B, and 5C and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples disclosed herein, means for recognizing features in sensor data may be implemented using one or more of the CNN feature analyzers 114 of FIG. 1A, the example CNN motion activity recognizer 504, the example CNN wake-up word recognizer 518, the example CNN command word recognizer 520, the example CNN wake-up face recognizer 532, the example CNN face recognizer 534, and/or the example CNN object recognizer 542 of FIG. 5A. In some examples disclosed herein, means for transitioning the mobile camera 100, 204 between different feature detection states (e.g., the motion feature detection state 304, the audio feature detection state 306, the low-resolution camera feature detection state 308, the computer vision processing feature detection state 310, the CNN feature detection state 312, the high-resolution camera feature detection state 314, and/or the video capture state 316 of FIGS. 3 and 4) may be implemented using one or more of the example POR state transitioner 562, the example AoN state transitioner 564, the example primary event state transitioner 566, the example secondary event state transitioner 568, the example tertiary event state transitioner 570, and/or the example fully active state transitioner 572 of FIG. 5B. In some examples disclosed herein, means for communicating may be implemented by the wireless communication interface 110 of FIGS. 1A and 1B and/or by the interface circuit 720 of FIG. 7. In some examples, means for detecting features may be implemented by one or more of the motion feature detector 502, the audio feature detector 515, and/or the image feature detector 528 of FIG. 5A. In some examples disclosed herein, means for configuring operating state order may be implemented by the example state-order configurator 582 of FIG. 5C.

Figure 6:
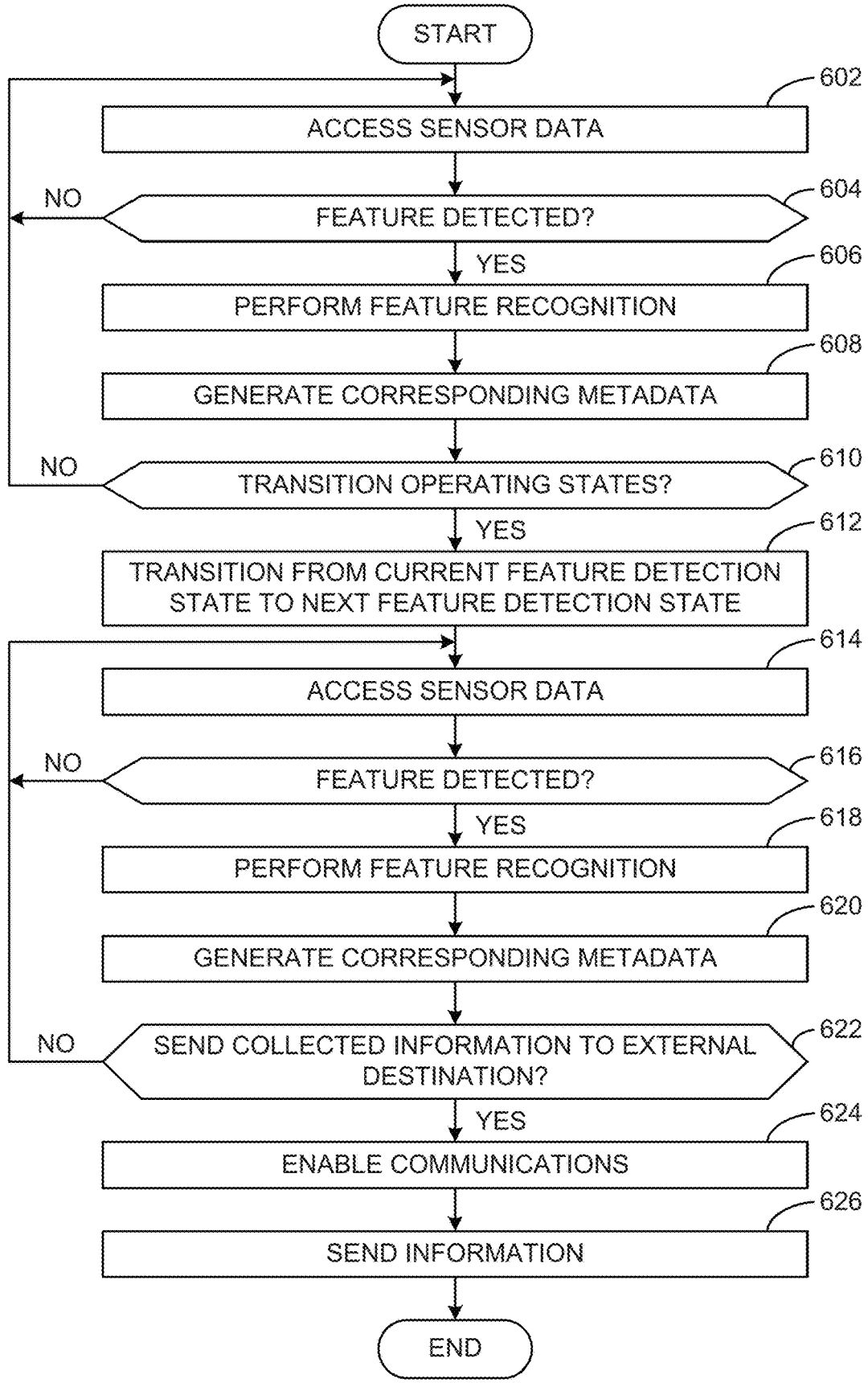
FIG. 6 illustrates a flowchart representative of example machine-readable instructions that may be executed to implement the mobile cameras of FIGS. 1A, 1B, and 2 and/or the VPU 108 of FIGS. 1A, 1B, 5A, 5B, and 5C to operate at the different power-level operating states of FIG. 3.

A flowchart representative of example hardware logic or machine-readable instructions for implementing the mobile camera 100, 204 and/or the VPU 108 of FIGS. 1A, 1B, 2, 5A, 5B, and 5C is shown in FIG. 6. The machine-readable instructions may be a program or portion of a program for execution by a processor such as the VPU 108 and/or the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example mobile camera 100, 204 and/or the VPU 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The terms "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Turning in detail to FIG. 6, the example program transitions the mobile camera 100, 204 between first and second feature detection states. The feature detection states may be any of the operating states of the example multiple power-level operating state hierarchy 300 of FIG. 3. Thus, example operations represented in FIG. 6 may be performed by any components of a mobile camera 100, 204 and/or the VPU 108 of FIGS. 1A, 1B, 5A, 5B, and/or 5C corresponding to the feature detection states for which the example program of FIG. 6 is used.

The program of FIG. 6 begins at block 602 at which the example VPU 108 (FIGS. 1A, 1B, 6A and 6B) accesses sensor data. For example, the sensor data may be motion sensor data, audio sensor data, and/or visual capture data obtained from the motion feature detector 502, the audio feature detector 514, and/or the image feature detector 528 of FIG. 5A. The example VPU 108 determines whether a feature of interest has been detected in the sensor data (block 604). In some examples, the motion feature detector 502 analyzes the sensor data for a motion feature having sufficient magnitude and/or sufficient duration to satisfy a motion feature trigger threshold. In some examples, the audio feature detector 514 analyzes the sensor data for an audio feature having sufficient amplitude and/or sufficient duration to satisfy an audio feature trigger threshold. In some examples, the image feature detector 528 analyzes the sensor data for a visual feature having sufficient visual definition and/or sufficient duration to satisfy a visual feature trigger threshold. If a feature of interest has not been detected at block 604, control returns to block 602 to obtain further sensor data to analyze.

When the VPU 108 determines at block 604 that a feature of interest is detected in the sensor data, the example VPU 108 performs a feature recognition analysis on the sensor data (block 606). In some examples, motion activity recognition is performed by the CNN motion activity recognizer 504 (FIG. 5A). In some examples, word recognition is performed by the CNN wake-up word recognizer 518 and/or the CNN command word recognizer 520 (FIG. 5A). In some examples, face recognition is performed by the CNN wake-up face recognizer 532 and/or the CNN face recognizer 534 (FIG. 5A). The example VPU 108 generates corresponding metadata for a recognized feature in the sensor data (block 608). In some examples, the CNN motion activity recognizer 504 generates motion metadata. In some examples, the CNN wake-up word recognizer 518 and/or the CNN command word recognizer 520 generate(s) audio metadata. In some examples, the CNN wake-up face recognizer 532 and/or the CNN face recognizer 534 generate(s) face metadata. The example VPU 108 determines whether to transition the mobile camera 100, 204 to another operating state (block 610). For example, a state transitioner 562, 564, 566, 568, 570, or 572 (FIG. 5B) corresponding to a current operating state of the mobile camera 100, 204 may determine whether to transition the mobile camera 100, 204 to another operating state based on whether the feature of interest recognized at block 606 satisfies a threshold to warrant such state transition. If the example VPU 108 determines at block 610 to not transition the mobile camera 100, 204 to another operating state, control returns to block 602 to obtain further sensor data to analyze.

When the example VPU 108 determines at block 610 to transition the mobile camera 100, 204 to another operating state, the VPU 108 transitions the mobile camera 100, 204 from a current feature detection state to a next feature detection state (block 612). For example, a state transitioner 562, 564, 566, 568, 570, or 572 corresponding to a current operating state of the mobile camera 100, 204 transitions the mobile camera 100, 204 from a current feature detection state to a next feature detection state based on the feature of interest recognized at block 606. In some examples, the next feature detection state contributes to relatively higher power consumption by the mobile camera 100, 204 than the current feature detection state in which the mobile camera 100, 204 operates before the transition of block 612. In some examples, the example state-order configurator 582 of FIG. 5C contributes to the implementation of block 612 by controlling or configuring the ordering of the operating states between which the transition occurs at block 612.

The example VPU 108 accesses sensor data (block 614). For example, a feature detector 502, 514, 528 (FIG. 5A) corresponding to the operating state into which the mobile camera 100, 204 transitioned to at block 612 obtains corresponding sensor data. In examples in which the VPU 108 transitions the mobile camera 100, 204 to the high-resolution camera feature detection state 314 and/or the video capture state 316, the CNN object recognizer 542 obtains the sensor data at block 614. The example VPU 108 determines whether a feature of interest has been detected in the sensor data (block 616). For example, a feature detector 502, 514, 528 may perform a feature detection analysis at block 616 on the sensor data to determine if a feature of interest is present in the sensor data. In some examples involving sensor data that represents visual captures, the CNN face detector 530 of FIG. 5A may perform a feature detection analysis on the sensor data at block 616 after the image feature detector 528 detects a visual feature of interest in the sensor data. In some examples involving sensor data that includes audio data, the voice activity detector 516 of FIG. 5A may perform a feature detection analysis on the sensor data at block 616 after the audio feature detector 514 detects an audio feature of interest in the sensor data. If a feature of interest has not been detected at block 616, control returns to block 614 to obtain further sensor data to analyze. In some examples, after a threshold duration of time or a threshold number of times that the VPU 108 does not detect a feature of interest in the sensor data at block 616, the VPU 108 may transition the camera 100, 204 back to a previous operating state, and control returns to block 602.

When the VPU 108 determines at block 616 that a feature of interest has been detected in the sensor data, the example VPU 108 performs a feature recognition analysis on the sensor data (block 618). In the illustrated example, the feature recognition analysis is performed by a CNN recognizer 504, 518, 520, 532, 534, and/or 542 of FIG. 5A corresponding to the operating state in which the mobile camera 100, 204 is currently operating. The example VPU 108 generates corresponding metadata for a recognized feature in the sensor data (block 620). The example VPU 108 determines whether to send collected information to an external destination (block 622). For example, the VPU 108 can determine based on inputs to the full wake-up event multiplexer 510 (FIG. 5A) whether to send the metadata generated at block 620 and/or block 608 as the metadata output 550 from the mobile camera 100, 204 to a corresponding mobile phone host device 202 (FIG. 2), to another mobile camera 100, 204, and/or to the cloud system 206 (FIG. 2). In some examples, the VPU 108 additionally or alternatively determines whether to send the sensor data from block 602 and/or block 614 to an external destination. If the VPU 108 determines at block 622 to not send the collected information to an external destination, control returns to block 614 to access further sensor data.

When the example VPU 108 determines at block 622 to send the collected information to an external destination, the VPU 108 enables the wireless communication interface 110 (FIGS. 1A and 1B) (block 624). For example, the fully active state transitioner 572 (FIG. 5B) provides power to the wireless communication interface 110 and/or sets an enable line of the wireless communication interface 110 to its active state. The example VPU 108 sends the collected information (block 626). For example, the VPU 108 may send the metadata generated at block 620 and/or block 608 and/or the sensor data from block 602 and/or block 614 from the mobile camera 100, 204 to a corresponding mobile phone host device 202, to another mobile camera 100, 204, and/or to the cloud system 206. In some examples, the mobile phone host device 202 and/or the other mobile camera 100, 204, in turn, send(s) the collected information to the cloud system 206. The example process of FIG. 6 ends.

Figure 7:
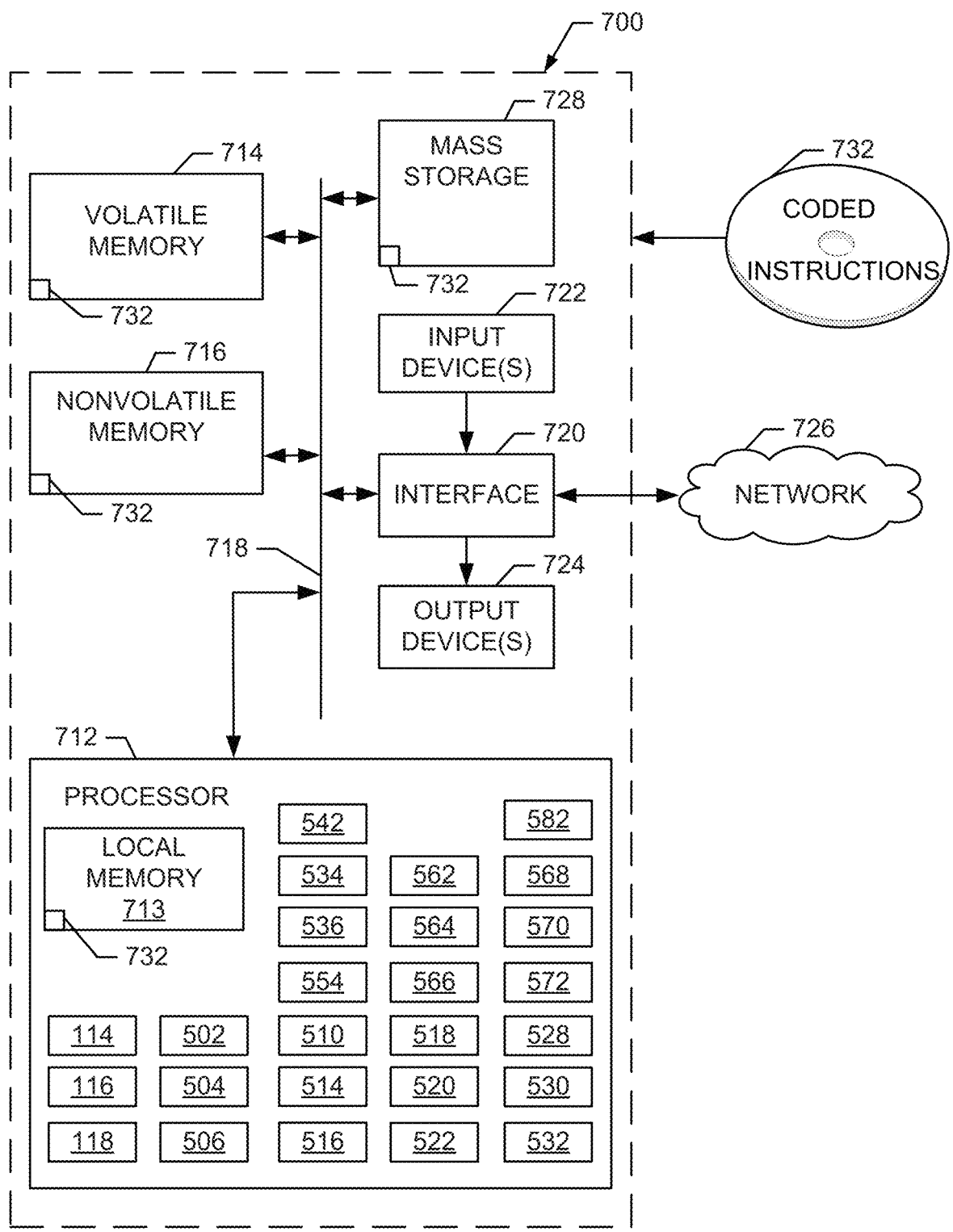
FIG. 7 illustrates a processor platform capable of executing the machine-readable instructions of FIG. 6 to implement the mobile cameras of FIGS. 1A, 1B, and 2 and/or the VPU 108 of FIGS. 1A, 1B, 5A, 5B, and 5C to operate at the different power-level operating states of FIG. 3.

FIG. 7 illustrates a block diagram of an example processor platform 700 structured to execute the instructions of FIG. 6 to implement the mobile camera 100, 204 of FIGS. 1A, 1B, and 2 and/or the VPU 108 of FIGS. 1A, 1B, 5A, 5B, and 5C. The processor platform 700 can be, for example, a camera, a computer, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In some examples, the processor 712 implements the VPU 108. In this example, the processor implements the example CNN feature analyzers 114, the example computer vision algorithms 116, and/or the example digital signal processors 118 of FIG. 1A, the example motion feature detector 502, the example CNN motion activity recognizer 504, the example motion activity multiplexer 506, the example full wake-up event multiplexer 510, the example audio feature detector 514, the example voice activity detector 516, the example CNN wake-up word recognizer 518, the example CNN command word recognizer 520, the example command word multiplexer 522, the example image feature detector 528, the example CNN face detector 530, the example CNN wake-up face recognizer 532, the example CNN face recognizer 534, the example recognized face multiplexer 536, the example CNN object recognizer 542, and/or the example trigger feature multiplexers 554 of FIG. 5A, the example POR state transitioner 562, the example AoN state transitioner 564, the example primary event state transitioner 566, the example secondary event state transitioner 568, the example tertiary event state transitioner 570, and/or the example fully active state transitioner 572 of FIG. 5B, and/or the example state-order configurator 582 of FIG. 5C.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Wi-Fi interface, a Bluetooth® interface, Zigbee® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a motion sensor, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or a speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 representative of the example machine-readable instructions of FIG. 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, and articles of manufacture have been disclosed to operate mobile cameras having limited power sources while enabling numerous uses for the mobile cameras for productivity, entertainment, and as assistive technologies that assist users in their day-to-day activities. Example mobile cameras disclosed herein operate in a low-power feature monitoring mode and one or more higher-power active modes. The low-power feature monitoring mode enables a mobile camera to monitor characteristics of its surrounding environment while consuming substantially little power (e.g., ~2 milliwatts). In the low-power feature monitoring mode, environment analysis logic of an example mobile camera monitors environmental characteristics to identify features of interest representing stimuli that warrant transitioning the mobile camera to a higher-power active mode in which the mobile camera can monitor additional types of environmental characteristics and/or capture high-quality visual captures. In such manners, examples disclosed herein enable mobile cameras to operate in power-constrained configurations for long durations while the mobile cameras intelligently operate intermittently in higher-power modes to capture high-quality data such as high-resolution visual captures of their surrounding environments.

Examples disclosed herein also enable mobile cameras to transmit metadata generated from collected sensor data (e.g., motion data, audio data, visual captures, etc.) instead of transmitting the sensor data itself. Since metadata is smaller in data size than raw sensor data, transmitting the sensor data from the mobile cameras to host devices or a cloud service conserves network bandwidth, thus, reducing network congestion and increasing the speed at which such metadata can be received at its destination locations. It also reduces power consumption of the mobile cameras due to needing to transmit less data due to the metadata being of smaller data size than raw sensor data. Such power consumption reduction is especially significant with respect to using Wi-Fi communications, which can be especially demanding on power requirements for performing transmissions. Reducing power consumption in this manner is useful in small portable electronics, such as mobile cameras, that have small batteries and, thus, small charge capacities. In addition, transmitting metadata across a network from the mobile cameras protects privacies of persons and/or private/personal property by not revealing raw sensor data that could be used to identify such persons and/or private/personal property. As such, examples disclosed herein can be used to reduce network congestion and protect privacies of persons by transmitting metadata about sensor data from mobile cameras to destination locations across a network.

The following pertain to further examples disclosed herein.

Example 1 is a mobile camera. The mobile camera of Example 1 includes a first convolutional neural network to recognize a first feature in first sensor data in response to the first feature being detected in the first sensor data; a state transitioner to transition the mobile camera from a first feature detection state to a second feature detection state in response to the first convolutional neural network recognizing the first feature, the mobile camera to operate using higher power consumption in the second feature detection state than in the first feature detection state; a second convolutional neural network to recognize a second feature in second sensor data in the second feature detection state; and a communications interface to send to an external device at least one of first metadata corresponding to the first feature or second metadata corresponding to the second feature.

In Example 2, the subject matter of Example 1 can optionally include an image feature detector in circuit with a low-resolution camera, the low-resolution camera to provide the first sensor data in the first feature detection state, the image feature detector to detect the first feature in the first sensor data; and a high-resolution camera having a standby mode when the mobile camera is in the first feature detection state and having an active mode when the mobile camera is in the second feature detection state.

In Example 3, the subject matter of any one of Examples 1-2 can optionally include a feature detector to determine whether the first feature satisfies a feature trigger threshold, the first convolutional neural network to generate the first metadata in response the first feature satisfying the feature trigger threshold.

In Example 4, the subject matter of any one of Examples 1-3 can optionally include a motion feature detector in circuit with an inertial measurement unit, the first sensor data provided by a motion sensor in circuit with the inertial measurement unit, and the motion feature detector to detect the first feature in the first sensor data.

In Example 5, the subject matter of any one of Examples 1-4 can optionally include that the first convolutional neural network is to generate the first metadata by comparing the first feature to a reference motion feature definition in a reference motion metadata library.

In Example 6, the subject matter of any one of Examples 1-5 can optionally include an audio feature detector in circuit with an audio codec, the first sensor data being audio data, and the audio feature detector to detect the first feature in the audio data.

In Example 7, the subject matter of any one of Examples 1-6 can optionally include that the first convolutional neural network is to generate the first metadata by comparing the first feature to a reference audio feature definition in a reference audio metadata library.

In Example 8, the subject matter of any one of Examples 1-7 can optionally include that the audio feature detector is to detect the first feature in the audio data based on at least one of: (a) speech, (b) a vehicle sound, (c) or a rate of change in an audio signal reflected in the audio data.

In Example 9, the subject matter of any one of Examples 1-8 can optionally include an image feature detector in circuit with a low-resolution camera, the first sensor data being a visual capture, and the image feature detector to detect the first feature in the visual capture.

In Example 10, the subject matter of any one of Examples 1-9 can optionally include that the first convolutional neural network is to generate the first metadata by comparing the first feature to a reference visual feature definition in a reference image metadata library.

In Example 11, the subject matter of any one of Examples 1-10 can optionally include that the image feature detector is to detect the first feature in the visual capture based on at least one of: (a) an edge, (b) a line, (c) or a face in the visual capture.

In Example 12, the subject matter of any one of Examples 1-11 can optionally include that the external device is at least one of a mobile phone, a second mobile camera, or a wearable device.

Example 13 is a mobile camera. The mobile camera of Example 13 includes first means for recognizing a first feature in first sensor data in response to the first feature being detected in the first sensor data; means for transitioning the mobile camera from a first feature detection state to a second feature detection state in response to the recognizing of the first feature, the second feature detection state to contribute to relatively higher power consumption by the mobile camera than the first feature detection state; second means for recognizing a second feature in second sensor data collected; and means for communicating to an external device at least one of first metadata corresponding to the first feature or second metadata corresponding to the second feature.

In Example 14, the subject matter of Example 13 can optionally include means for detecting features to detect the first feature in the first sensor data.

In Example 15, the subject matter of any one of Examples 13-14 can optionally include the means for detecting features is to determine detect the first feature based on determining that the first feature satisfies a feature trigger threshold, the first means for recognizing to generate the first metadata after the means for detecting features determines that the first feature satisfies the feature trigger threshold.

In Example 16, the subject matter of any one of Examples 13-15 can optionally include means for detecting features to detect the first feature in motion data of the first sensor data provided by an inertial measurement unit.

In Example 17, the subject matter of any one of Examples 13-16 can optionally include the first means for recognizing is to compare the first feature to a reference motion feature definition in a reference motion metadata library to generate the first metadata.

In Example 18, the subject matter of any one of Examples 13-17 can optionally include means for detecting features to detect the first feature in audio data of the first sensor data.

In Example 19, the subject matter of any one of Examples 13-18 can optionally include that the first means for recognizing is to compare the first feature to a reference audio feature definition in a reference audio metadata library to generate the first metadata.

In Example 20, the subject matter of any one of Examples 13-19 can optionally include that the means for detecting features is to detect the first feature in the audio data based on at least one of: (a) speech, (b) a vehicle sound, (c) or a rate of change in an audio signal reflected in the audio data.

In Example 21, the subject matter of any one of Examples 13-20 can optionally include means for detecting features is to detect the first feature in a visual capture represented by the first sensor data.

In Example 22, the subject matter of any one of Examples 13-21 can optionally include that the first means for recognizing is to compare the first feature to a reference visual feature definition in a reference image metadata library to generate the first metadata.

In Example 23, the subject matter of any one of Examples 13-22 can optionally include that the means for detecting features is to detect the first feature in the visual capture based on at least one of: (a) an edge, (b) a line, (c) or a face in the visual capture.

In Example 24, the subject matter of any one of Examples 13-23 can optionally include that the external device is at least one of a mobile phone, a second mobile camera, or a wearable device.

Example 25 is a non-transitory computer readable storage medium comprising instructions that, when executed, cause at least one processor to at least recognize a first feature in first sensor data in response to the first feature being detected in the first sensor data; transition a mobile camera from a first feature detection state to a second feature detection state in response to the recognizing of the first feature, the mobile camera to operate using higher power consumption in the second feature detection state than in the first feature detection state; recognize a second feature in second sensor data in the second feature detection state; and send to an external device at least one of first metadata corresponding to the first feature or second metadata corresponding to the second feature.

In Example 26, the subject matter of Example 25 can optionally include that the instructions further cause the at least one processor to set a high-resolution camera to a standby mode in the first feature detection state; access the first sensor data as a visual capture provided by a low-resolution camera in the first feature detection state; detect the first feature in the first sensor data; and set the high-resolution camera to an active mode in the second feature detection state.

In Example 27, the subject matter of any one of Examples 25-26 can optionally include that the instructions further cause the at least one processor to determine whether the first feature satisfies a feature trigger threshold; and generate the first metadata in response the first feature satisfying the feature trigger threshold.

In Example 28, the subject matter of any one of Examples 25-27 can optionally include that the instructions further cause the at least one processor to access the first sensor data as motion data provided by a motion sensor in circuit with an inertial measurement unit; and detect the first feature in the motion data.

In Example 29, the subject matter of any one of Examples 25-28 can optionally include that the instructions are further to cause the at least one processor to generate the first metadata by comparing the first feature to a reference motion feature definition in a reference motion metadata library.

In Example 30, the subject matter of any one of Examples 25-29 can optionally include that the instructions are further to cause the at least one processor to access the first sensor data as audio data provided by an audio codec; and detect the first feature in the audio data.

In Example 31, the subject matter of any one of Examples 25-30 can optionally include that the instructions are further to cause the at least one processor to generate the first metadata by comparing the first feature to a reference audio feature definition in a reference audio metadata library.

In Example 32, the subject matter of any one of Examples 25-31 can optionally include that the instructions are further to cause the at least one processor to detect the first feature in the audio data based on at least one of: (a) speech, (b) a vehicle sound, (c) or a rate of change in an audio signal reflected in the audio data.

In Example 33, the subject matter of any one of Examples 25-32 can optionally include that the instructions are further to cause the at least one processor to access the first sensor data as a visual capture provided by a low-resolution camera; and detect the first feature in the visual capture.

In Example 34, the subject matter of any one of Examples 25-33 can optionally include that the instructions are further to cause the at least one processor to generate the first metadata by comparing the first feature to a reference visual feature definition in a reference image metadata library.

In Example 35, the subject matter of any one of Examples 25-34 can optionally include that the instructions are further to cause the at least one processor to detect the first feature in the visual capture based on at least one of: (a) an edge, (b) a line, (c) or a face in the visual capture.

In Example 36, the subject matter of any one of Examples 25-35 can optionally include that the external device is at least one of a mobile phone, a second mobile camera, or a wearable device.

Example 37 is a method to operate a mobile camera. The method of Example 37 includes recognizing, by executing an instruction with a processor, a first feature in first sensor data in response to the first feature being detected in the first sensor data; transitioning, by executing an instruction with the processor, the mobile camera from a first feature detection state to a second feature detection state in response to the recognizing of the first feature, the mobile camera to operate using higher power consumption in second feature detection state than in the first feature detection state; recognizing, by executing an instruction with the processor, a second feature in second sensor data in the second feature detection state; and sending to an external device, by executing an instruction with the processor, at least one of first metadata corresponding to the first feature or second metadata corresponding to the second feature.

In Example 38, the subject matter of Example 37 can optionally include setting a high-resolution camera to a standby mode in the first feature detection state; accessing the first sensor data as a visual capture provided by a low-resolution camera in the first feature detection state; detecting the first feature in the first sensor data; and setting the high-resolution camera to an active mode in the second feature detection state.

In Example 39, the subject matter of any one of Examples 37-38 can optionally include determining whether the first feature satisfies a feature trigger threshold; and generating the first metadata in response the first feature satisfying the feature trigger threshold.

In Example 40, the subject matter of any one of Examples 37-39 can optionally include accessing the first sensor data as motion data provided by a motion sensor in circuit with an inertial measurement unit; and detecting the first feature in the motion data.

In Example 41, the subject matter of any one of Examples 37-40 can optionally include generating the first metadata by comparing the first feature to a reference motion feature definition in a reference motion metadata library.

In Example 42, the subject matter of any one of Examples 37-41 can optionally include accessing the first sensor data as audio data provided by an audio codec; and detecting the first feature in the audio data.

In Example 43, the subject matter of any one of Examples 37-42 can optionally include generating the first metadata by comparing the first feature to a reference audio feature definition in a reference audio metadata library.

In Example 44, the subject matter of any one of Examples 37-43 can optionally include detecting the first feature in the audio data based on at least one of: (a) speech, (b) a vehicle sound, (c) or a rate of change in an audio signal reflected in the audio data.

In Example 45, the subject matter of any one of Examples 37-44 can optionally include accessing the first sensor data as a visual capture provided by a low-resolution camera; and detecting the first feature in the visual capture.

In Example 46, the subject matter of any one of Examples 37-45 can optionally include generating the first metadata by comparing the first feature to a reference visual feature definition in a reference image metadata library.

In Example 47, the subject matter of any one of Examples 37-46 can optionally include detecting the first feature in the visual capture based on at least one of: (a) an edge, (b) a line, (c) or a face in the visual capture.

In Example 48, the subject matter of any one of Examples 37-47 can optionally include that the external device is at least one of a mobile phone, a second mobile camera, or a wearable device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A mobile camera comprising:
a plurality of state transition circuits to transition the mobile camera between a plurality of feature detection states; and
state-order configurable circuitry in circuit with the state transition circuits, the state-order configurable circuitry including configurable logic circuitry to activate different ones of the state transition circuits based on different combinations of inputs, the state-order configurable circuitry to:
based on a first combination of inputs, activate a first one of the state transition circuits to transition the mobile camera to a first one of the feature detection states; and
based on a second combination of inputs, reconfigure the configurable logic circuitry to:
skip at least a second one of the feature detection states by not activating a second one of the state transition circuits corresponding to the second one of the feature detection states, and
activate a third one of the state transition circuits to transition the mobile camera from the first one of the feature detection states to a third one of the feature detection states.

2. The mobile camera of claim 1, wherein the mobile camera is to consume less power in the third one of the feature detection states than in the second one of the feature detection states.

3. The mobile camera of claim 1, wherein the mobile camera is to consume more power in the third one of the feature detection states than in the first one of the feature detection states.

4. The mobile camera of claim 1, wherein the state-order configurable circuitry is to, based on a third combination of inputs, reconfigure the configurable logic circuitry to activate the second one of the state transition circuits to transition the mobile camera from the first one of the feature detection states to the second one of the feature detection states.

5. The mobile camera of claim 1, wherein the first one of the feature detection states is a motion feature detection state, the second one of the feature detection states is a low-resolution feature detection state, and the third one of the feature detection states is a high-resolution feature detection state.

6. The mobile camera of claim 1, wherein the second combination of inputs includes motion data and audio data.

7. The mobile camera of claim 1, further including a convolutional neural network to:
recognize a motion in motion data;
generate metadata corresponding to the motion; and
provide the metadata as an input of the second combination of inputs to the state-order configurable circuitry.

8. A mobile camera comprising:
memory;
instructions in the mobile camera; and
processor circuitry to execute the instructions to:
transition the mobile camera between a plurality of feature detection states based on an ordered arrangement;
activate different ones of state transition circuits based on different combinations of inputs by:
based on a first combination of inputs, activating a first one of the state transition circuits according to the ordered arrangement to transition the mobile camera to a first one of the feature detection states; and
based on a second combination of inputs, reconfiguring configurable logic circuitry to:
skip at least a second one of the feature detection states in the ordered arrangement by not activating a second one of the state transition circuits corresponding to the second one of the feature detection states, and activate a third one of the state transition circuits to transition the mobile camera from the first one of the feature detection states to a third one of the feature detection states.

9. The mobile camera of claim 8, wherein the mobile camera is to consume less power in the third one of the feature detection states than in the second one of the feature detection states.

10. The mobile camera of claim 8, wherein the mobile camera is to consume more power in the third one of the feature detection states than in the first one of the feature detection states.

11. The mobile camera of claim 8, wherein the processor circuitry is to, based on a third combination of inputs, reconfigure the configurable logic circuitry to activate the second one of the state transition circuits to transition the mobile camera from the first one of the feature detection states to the second one of the feature detection states.

12. The mobile camera of claim 8, wherein the first one of the feature detection states is an audio feature detection state, the second one of the feature detection states is a low-resolution feature detection state, and the third one of the feature detection states is a high-resolution feature detection state.

13. The mobile camera of claim 8, wherein the second combination of inputs includes audio data and image data.

14. A mobile camera comprising:
at least one memory; and
processor circuitry including one or more of:
at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the mobile camera;
a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
Application Specific Integrated Circuitry including logic gate circuitry to perform one or more third operations;
the processor circuitry to perform at least one of the first operations, the second operations, or the third operations to instantiate:
a plurality of state transition circuits to transition the mobile camera between a plurality of feature detection states based on an operating state hierarchy; and
state-order configurable circuitry in circuit with the state transition circuits, the state-order configurable circuitry including configurable logic circuitry to activate different ones of the state transition circuits based on different combinations of inputs, the state-order configurable circuitry to:
based on a first combination of inputs, activate a first one of the state transition circuits according to the operating state hierarchy to transition the mobile camera to a first one of the feature detection states; and
based on a second combination of inputs, reconfigure the configurable logic circuitry to:
skip at least a second one of the feature detection states in the operating state hierarchy by not activating a second one of the state transition circuits corresponding to the second one of the feature detection states, and
activate a third one of the state transition circuits to transition the mobile camera from the first one of the feature detection states to a third one of the feature detection states.

15. The mobile camera of claim 14, wherein the mobile camera is to consume less power in the third one of the feature detection states than in the second one of the feature detection states.

16. The mobile camera of claim 14, wherein the mobile camera is to consume more power in the third one of the feature detection states than in the first one of the feature detection states.

17. The mobile camera of claim 14, wherein the state-order configurable circuitry is to, based on a third combination of inputs, reconfigure the configurable logic circuitry to activate the second one of the state transition circuits to transition the mobile camera from the first one of the feature detection states to the second one of the feature detection states.

18. The mobile camera of claim 14, wherein the first one of the feature detection states is a motion feature detection state, the second one of the feature detection states is an audio feature detection state, and the third one of the feature detection states is a high-resolution feature detection state.

19. The mobile camera of claim 14, wherein the processor circuitry is to perform at least one of the first operations, the second operations, or the third operations to instantiate a convolutional neural network to:
recognize a audio in audio data;
generate metadata corresponding to the audio; and
provide the metadata as an input of the second combination of inputs to the state-order configurable circuitry.

20. A non-transitory computer readable storage medium comprising instructions that, when executed, cause processor circuitry to at least:
transition a mobile camera between a plurality of feature detection states;
activate different ones of state transition circuits based on different combinations of inputs by:
based on a first combination of inputs, activating a first one of the state transition circuits to transition the mobile camera to a first one of the feature detection states; and
based on a second combination of inputs, reconfiguring configurable logic circuitry to:
skip at least a second one of the feature detection states by not activating a second one of the state transition circuits corresponding to the second one of the feature detection states, and
activate a third one of the state transition circuits to transition the mobile camera from the first one of the feature detection states to a third one of the feature detection states.

21. The non-transitory computer readable storage medium of claim 20, wherein the mobile camera is to consume less power in the third one of the feature detection states than in the second one of the feature detection states.

22. The non-transitory computer readable storage medium of claim 20, wherein the mobile camera is to consume more power in the third one of the feature detection states than in the first one of the feature detection states.

23. The non-transitory computer readable storage medium of claim 20, wherein the instructions are to cause the processor circuitry to, based on a third combination of inputs, reconfigure the configurable logic circuitry to activate the second one of the state transition circuits to transition the mobile camera from the first one of the feature detection states to the second one of the feature detection states.

24. The non-transitory computer readable storage medium of claim 20, wherein the first one of the feature detection states is a motion feature detection state, the second one of the feature detection states is a low-resolution feature detection state, and the third one of the feature detection states is a high-resolution feature detection state.

25. The non-transitory computer readable storage medium of claim 20, wherein the second combination of inputs includes motion data and audio data.

* * * * *